US012141798B2

(12) United States Patent
Fletcher

(10) Patent No.: US 12,141,798 B2
(45) Date of Patent: Nov. 12, 2024

(54) SYSTEMS AND METHODS FOR AVOIDING OR REDUCING CRYPTOGRAPHICALLY STRANDED RESOURCES ON A BLOCKCHAIN NETWORK

(71) Applicant: nChain Licensing AG, Zug (CH)

(72) Inventor: John Fletcher, Cambridge (GB)

(73) Assignee: nChain Licensing AG, Zug (CH)

( * ) Notice: Subject to any disclaimer, the term of this patent is extended or adjusted under 35 U.S.C. 154(b) by 340 days.

(21) Appl. No.: 16/622,871

(22) PCT Filed: Jun. 11, 2018

(86) PCT No.: PCT/IB2018/054209
§ 371 (c)(1),
(2) Date: Dec. 13, 2019

(87) PCT Pub. No.: WO2018/229631
PCT Pub. Date: Dec. 20, 2018

(65) Prior Publication Data
US 2020/0211003 A1 Jul. 2, 2020

(30) Foreign Application Priority Data

Jun. 14, 2017 (GB) .................................... 1709431
Jun. 14, 2017 (GB) .................................... 1709432

(51) Int. Cl.
*G06Q 20/38* (2012.01)
*G06F 9/54* (2006.01)
(Continued)

(52) U.S. Cl.
CPC ......... *G06Q 20/3829* (2013.01); *G06F 9/542* (2013.01); *H04L 9/0637* (2013.01);
(Continued)

(58) Field of Classification Search
CPC ... G06Q 20/3829; G06F 9/542; H04L 9/0637; H04L 9/0643; H04L 9/30; H04L 9/3239; H04L 9/3255; H04L 63/1441
See application file for complete search history.

(56) References Cited

U.S. PATENT DOCUMENTS 10,102,265 B1 10/2018 Madisetti et al.
10,410,212 B2 * 9/2019 Heyner .................. G06F 21/60
(Continued)

FOREIGN PATENT DOCUMENTS

CN 106850200 A 6/2017
EP 3264672 A1 * 1/2018 ............. H04L 63/10
(Continued)

OTHER PUBLICATIONS

"Security Requirements and Protocols for a Broadcast Scenario"; S. Kent; IEEE Transactions on Communications ( vol. 29, Issue: 6, Jun. 1981), pp. 778-786; 1981 (Year: 1981).*
(Continued)

*Primary Examiner* — John W Hayes
*Assistant Examiner* — Edgar R. Martinez-Hernandez
(74) *Attorney, Agent, or Firm* — Davis Wright Tremaine LLP

(57) ABSTRACT

There may be provided a computer-implemented method for use with a blockchain. The computer-implemented method includes: broadcasting a first deposit transaction configured to allow a first digital asset to be unlocked after a defined period of time through generation of a signature which is valid for a first public key and unlocked at any time through generation of a signature which is valid for a second public key; before expiration of the defined period of time, broadcasting a first funding transaction which encumbers a second digital asset with the first public key, the second public key and a third public key; and after expiration of the defined
(Continued)

period of time, broadcasting a transaction unlocking the first digital asset with a signature which is valid for the first public key.

11 Claims, 7 Drawing Sheets

(51) Int. Cl.
　　*G06F 21/57*　　(2013.01)
　　*H04L 9/00*　　(2022.01)
　　*H04L 9/06*　　(2006.01)
　　*H04L 9/30*　　(2006.01)
　　*H04L 9/32*　　(2006.01)
　　*H04L 9/40*　　(2022.01)

(52) U.S. Cl.
　　CPC .............. *H04L 9/0643* (2013.01); *H04L 9/30* (2013.01); *H04L 9/3239* (2013.01); *H04L 9/3247* (2013.01); *H04L 9/3255* (2013.01); *H04L 63/1441* (2013.01); *G06F 21/57* (2013.01); *H04L 9/50* (2022.05); *H04L 63/0442* (2013.01); *H04L 2209/56* (2013.01)

(56) References Cited

U.S. PATENT DOCUMENTS

| | | | |
|---|---|---|---|
| 11,223,609 | B2 | 1/2022 | Altenhofen et al. |
| 2010/0023803 | A1 | 1/2010 | Lehr et al. |
| 2011/0033050 | A1* | 2/2011 | Maller ................... H04L 51/00 705/14.58 |
| 2013/0226797 | A1* | 8/2013 | Jiang ..................... G06Q 20/343 705/44 |
| 2014/0258109 | A1* | 9/2014 | Jiang ..................... G06Q 20/352 705/41 |
| 2016/0350728 | A1* | 12/2016 | Melika ................ G06Q 20/3829 |
| 2017/0154331 | A1 | 6/2017 | Voorhees |
| 2017/0230189 | A1 | 8/2017 | Toll et al. |
| 2017/0236104 | A1 | 8/2017 | Biton |
| 2018/0109541 | A1 | 4/2018 | Gleichauf |
| 2018/0205555 | A1 | 7/2018 | Watanabe et al. |
| 2018/0212772 | A1* | 7/2018 | Leavy ................... H04L 9/0822 |
| 2018/0268386 | A1* | 9/2018 | Wack ..................... H04L 63/06 |
| 2019/0228413 | A1 | 7/2019 | Naganuma et al. |
| 2019/0394047 | A1 | 12/2019 | Karame et al. |

FOREIGN PATENT DOCUMENTS

| | | | | |
|---|---|---|---|---|
| EP | 3855677 | A1 * | 7/2021 | ......... G06Q 20/0658 |
| JP | 7072587 | B2 | 5/2022 | |
| WO | WO-2016161073 | A1 * | 10/2016 | ............. G06Q 20/06 |

OTHER PUBLICATIONS

"Bitcoin and Beyond: A Technical Survey on Decentralized Digital Currencies"; Florian Tschorsch, Björn Scheuermann; IEEE Communications Surveys & Tutorials ( vol. 18, Issue: 3, thirdquarter 2016) pp. 2084-2123; (Year: 2016).*
Antonopoulos, "Mastering Bitcoin—Unlocking Digital Cryptocurrencies," O'Reilly Media, Inc., Dec. 20, 2014, 282 pages.
Bentov et al., "Tesseract: Real-Time Cryptocurrency Exchange using Trusted Hardware," retrieved from https://pdfs.semanticscholar.org/f234/f428eb552b94435683e7e784e805c201d309.pdf, Nov. 28, 2017, 21 pages.
Goldfeder et al., "Escrow Protocols for Cryptocurrencies: How to Buy Physical Goods Using Bitcoin," retrieved from http://stevengoldfeder.com/papers/escrow.pdf, Jul. 26, 2018, 27 pages.
Hearn, "Working with Micropayment Channels," retrieved from https://web.archive.org/web/20170321012514/https://bitcoinj.github.io/working-withmicropayments, Mar. 21, 2017, 8 pages.
International Search Report and Written Opinion mailed Aug. 17, 2018, Patent Application No. PCT/IB2018/054209, 12 pages.
International Search Report and Written Opinion mailed Aug. 20, 2018, Patent Application No. PCT/IB2018/054210, 13 pages.
Kremser, "[Lightning-dev] Proposal: Decentralized Service Provider," retrieved from https://lists.linuxfoundation.org/pipermail/lightning-dev/2016- March/000488.html, Mar. 11, 2016, 2 pages.
Lind et al., "Teechan: Payment Channels Using Trusted Execution Environments, " retrieved from http://fc17.ifca.ai/bitcoin/papers/bitcoin17-final21.pdf, Mar. 7, 2017, 14 pages.
Lnquery, "IRC Logs for #lightning-dev | BotBot.me [o_o], " retrieved from https://botbot.me/freenode/lightning-dev/2016-10-01/?tz=Europe/London, Dec. 10, 2016, 13 pages.
Miller et al., "Sprites: Payment Networks that Go Faster than Lightning," Feb. 19, 2017, 24 pages.
Nakamoto, "Bitcoin: A Peer-to-Peer Electronic Cash System," Bitcoin, Oct. 31, 2008, https://bitcoin.org/bitcoin.pdf, 9 pages.
Poon et al., "The Bitcoin Lightning Network: Scalable Off-Chain Instant Payments," https://www.bitcoinlightning.com/wp-content/uploads/2018/03/lightning-network-paper.pdf, Jan. 14, 2016 [retrieved Dec. 10, 2018], 59 pages.
Poon, "[Lightning-dev] 2-of-3 Instant Escrow, or How to Do "2-of-3 Multisig Contract" Equivalent on Lightning," retrieved from https://lists.linuxfoundation.org/pipermail/lightning-dev/2016- January/000403.html, Jan. 17, 2016, 3 pages.
Satoshi et al., "Connection Limits," Bitcoin Forum, Aug. 9, 2010, https://bitcointalk.org/index.php?topic=741.0; prev_next=prev, 2 pages.
Stathakopoulou et al., "Threshold Signatures for Blockchain Systems," IBM Research, Apr. 2017, 42 pages.
Techmedia, "Teechan's Settlement Protocol," retrieved from http://techmediathink.hatenablog.com/entry/2016/12/24/152906, filed Dec. 24, 2022, 1 page.
UK Commercial Search Report mailed Sep. 29, 2017, Patent Application No. GB1709431.9, 7 pages.
UK Commercial Search Report mailed Sep. 29, 2017, Patent Application No. GB1709432.7, 7 pages.
UK IPO Search Report mailed Nov. 22, 2017, Patent Application No. GB1709432.7, 4 pages.
Bitcoinj, "Working With Micropayment Channels," bitcoinj, retreived Sep. 26, 2017, https://web.archive.org/web/20170321012514/https://bitcoinj.github.io/working-withmicropayments, 8 pages.
Tschorsch et al., "Bitcoin and beyond: A technical survey on decentralized digital currencies," IEEE Communications Surveys and Tutorials 18(3):2084-123, Mar. 2, 2016.
Kent, "Security Requirements and Protocols for a Broadcast Scenario," IEEE Transactions on Communications, 29(6): Jun. 1981, 9 pages.
Shamir, "How to Share a Secret", Programming Techniques, 1979, 2 pages.
Poon, "The Bitcoin Lightning Network", Draft Version 0.5, 2015, 23 pages.
Nikkei Business Publications, Inc., "Micropayment Channel", 2016, 6 pages.
UK IPO Search Report mailed Nov. 22, 2017, Patent Application No. GB1709431.9, 4 pages.
Mori Takashi, et al., "Electronic Money Management Server" vol. 65, No. 1, Jan. 1998, 14 pages,.
Anonymous, "Whitepaper—Resources—Cosmos Network", Jan. 1, 2017, URL:https://cosmos.network/resources/white paper, 30 pages.

* cited by examiner

SYSTEMS AND METHODS FOR AVOIDING OR REDUCING CRYPTOGRAPHICALLY STRANDED RESOURCES ON A BLOCKCHAIN NETWORK

CROSS-REFERENCE TO RELATED APPLICATION

This application is a 371 National Stage Patent Application of International Patent Application No. PCT/IB2018/054209, filed on Jun. 11, 2018, which claims priority to United Kingdom Patent Application No. 1709431.9, filed Jun. 14, 2017, and United Kingdom Patent Application No. 1709432.7, filed Jun. 14, 2017, the disclosures of which are incorporated herein by reference in their entirety.

BACKGROUND

This invention relates generally to distributed ledgers, and more particularly to methods and systems for facilitating off-blockchain channels which have been set up between participants for the purpose of electronic communication, transfer and exchange. The invention is particularly suited, but not limited to, setting up an off-blockchain channel to allow recovery of/access to digital resources associated with a channel when a counter party fails to complete setup of the channel. The invention provides cryptographically enforced solutions for use in respect of channels established between participants, to ensure that resources can continue to accessed even in the event of failure of one or more participants to complete an exchange

SUMMARY

In this document we use the term 'blockchain' to include all forms of electronic, computer-based, distributed ledgers. These include, but are not limited to blockchain and transaction-chain technologies, permissioned and un-permissioned ledgers, shared ledgers and variations thereof. The most widely known application of blockchain technology is the Bitcoin ledger, although other blockchain implementations have been proposed and developed. While Bitcoin may be referred to herein for the purpose of convenience and illustration, it should be noted that the invention is not limited to use with the Bitcoin blockchain and alternative blockchain implementations and protocols fall within the scope of the present invention.

A blockchain is a consensus-based, electronic ledger which is implemented as a computer-based decentralised, distributed system made up of blocks which in turn are made up of transactions and other information. In the case of Bitcoin, each transaction is a data structure that encodes the transfer of control of a digital asset between participants in the blockchain system, and includes at least one input and at least one output. Each block contains a hash of the previous block to that blocks become chained together to create a permanent, unalterable record of all transactions which have been written to the blockchain since its inception. Transactions contain small programs known as scripts embedded into their inputs and outputs, which specify how and by whom the outputs of the transactions can be accessed. On the Bitcoin platform, these scripts are written using a stack-based scripting language.

In order for a transaction to be written to the blockchain, it must be "validated". Some network nodes act as miners and perform work to ensure that each transaction is valid, with invalid transactions rejected from the network. For example, software clients installed on the nodes perform this validation work on transactions that reference unspent transaction outputs (UTXO). Validation may be performed by executing its locking and unlocking scripts. If execution of the locking and unlocking scripts evaluate to TRUE and, if certain other conditions are met, the transaction is valid and the transaction may be written to the blockchain. Thus, in order for a transaction to be written to the blockchain, it must be i) validated by a node that receives the transaction—if the transaction is validated, the node relays it to the other nodes in the network; and ii) added to a new block built by a miner; and iii) mined, i.e. added to the public ledger of past transactions. The transaction is considered to be confirmed when a sufficient number of blocks are added to the blockchain to make the transaction practically irreversible.

Although blockchain technology is most widely known for the use of cryptocurrency implementation, digital entrepreneurs have begun exploring the use of both the cryptographic security system Bitcoin is based on and the data that can be stored on the Blockchain to implement new systems. It would be highly advantageous if the blockchain could be used for automated tasks and processes which are not purely limited to payments denominated in cryptocurrency. Such solutions would be able to harness the benefits of the blockchain (e.g. a permanent, tamper proof records of events, distributed processing etc.) while being more versatile in their applications.

Scalability within blockchain protocols, including Bitcoin, is a topic of much debate within the cryptocurrency community. The issue of how to enable scaling raises various technical challenges. For example, since blockchains operate through a "gossip protocol" in which all state modifications to the ledger are broadcast to all participants and consensus of the state is agreed upon based on this gossip protocol, every node in the blockchain network must know about every transaction that occurs globally. This global tracking of transactions can limit the volume or frequency of transactions on at least some blockchain networks. For example, as implemented at the time of writing, Bitcoin would likely not be able to replace high-volume existing electronic payment systems, such as Visa™. For example, it has been estimated that implementing Visa transactions on Bitcoin would consume 400 terabytes of data per year alone. Many nodes of existing networks could not handle this amount of bandwidth and storage.

To accommodate higher transaction volumes, off-chain (i.e., off-blockchain) payment channels have been proposed. For example, an off-chain payment channel called the "Lightning Network" is described by Poon and Dryja in "The Bitcoin Lightning Network: Scalable Off-Chain Instant Payments", Jan. 14, 2016. The Lightning Network allows transactions of value to occur off-blockchain. The Lightning Network describes a technique in which, in the event of certain uncooperative or hostile behaviour off-chain after a payment channel has been opened, half-signed commitment transactions previously exchanged off-chain can be fully signed and broadcast on the blockchain.

The Lightning Network, if it were to be implemented on Bitcoin, for example, without the introduction of a transaction-malleability mechanism, can, however, cause digital assets to be cryptographically stranded in certain circumstances. For example, a payment channel is initiated in the Lightning Network when at least two nodes transfer digital assets in an "opening transaction" to a multisignature address (also referred to as a "multisig" address). This multisig address is configured such the digital assets transferred to the multisig address can only be spent if both participants in the payment channel (i.e., the at least two nodes that transferred the digital assets to the multisig address) both sign a transaction. Digital assets can become cryptographically stranded (in the sense that they have become unobtainable due to uncooperative behaviour of the other party involved in the payment channel, who may be referred to as the counter party) if, for example, the counter party does not act in accordance with the Lightning Network protocol. For example, a node might transfer a digital asset to the multisig address and the counter party may fail to transfer corresponding digital assets to that multisig address. The counter party may then refuse to assist the node in the return of the digital assets so that the digital assets become cryptographically stranded. Cryptographic constraints associated with the multisig address prevent the return of the digital assets without the participation of the counter party.

Further, even if both nodes transfer digital assets to the multisig address in accordance with the Lightning Network protocol, a counter party may nevertheless stop participating before any activity (such as the exchange of commitment transactions) occurs on the payment channel. After the payment channel has been opened, the counter party has incentive to participate (i.e., since the digital assets that they transferred to the multisig address are now in partial control of the other party). However, their participation may cease for any one of a number of possible reasons. By way of example, the counter party could cease to participate if they inadvertently deleted a requisite private key. If the counter party ceases to participate before the first commitment transaction is received, then the digital assets transferred to the multisig address may become cryptographically stranded.

One solution to the cryptographic stranding of assets is segregated witness. However, segregated witness requires an update to the Bitcoin core protocol, for example, and, given the distributed nature of blockchain networks, updates to the core protocol can be difficult to implement. Moreover, concerns have been voiced within the Bitcoin community that the introduction of segregated witness (SegWit) would alter the Bitcoin protocol in a fundamental way, bringing with it potential security issues which could give rise to exploitation.

Thus, there is a need for improved techniques for setting up payment channels.

Thus, in accordance with the present invention there is provided a method as defined in the appended claims.

As will be described in greater detail below, techniques for establishing a channel for off-chain transfers of digital assets are described. The channel may be referred to as a "payment channel", a "transfer channel", "communication channel" or an "exchange channel". The term "payment channel" may be used for ease of reference.

More particularly, a congress may be used during the setup of a channel. A congress is a group of nodes which may be joined by any node in the blockchain network upon submission of sufficient stake (a "member deposit") to a pool of digital assets associated with the congress. For example, a node may join a congress through transfer of a digital asset or resource, such as digital currency (such as bitcoin), tokens or other stake or value, to an account associated with the congress. The congress may be secured, in part, through distributed generation of private key shares. Each private key share may be used by its holder to generate a partial signature for a transaction. A threshold signature scheme may be used to generate a valid signature for such a transaction using at least a threshold of partial signatures. The member deposit is subject to confiscation for malicious behaviour.

Advantageously, through the use of a congress during the setup of a channel, the threat of cryptographically stranded digital assets is reduced. The payment channel can, therefore, be used to offload transactions from the blockchain network without causing digital assets to be cryptographically stranded. Thus, resources can be accessed and utilised by the relevant party or parties. The techniques described herein allow a payment channel network to be provided on an existing blockchain network, such as Bitcoin, without the need for modification of the underlying protocol.

Therefore, in accordance with the invention there may be provided a computer-implemented method. The computer-implemented method may include: broadcasting, to nodes of a blockchain network, a first deposit transaction, the first deposit transaction configured to allow a first digital asset to be unlocked after a defined period of time through generation of a signature which is valid for a first public key and to be unlocked at any time through generation of a signature which is valid for a second public key; before expiration of the defined period of time, broadcasting to the blockchain network a first funding transaction which encumbers a second digital asset with the first public key, the second public key and a third public key such that the encumbrance of the second digital asset may be removed by: 1) both a signature valid for the first public key and a signature valid for the third public key; or 2) a signature valid for the second public key; and after expiration of the defined period of time, broadcasting a transaction unlocking the first digital asset with a signature which is valid for the first public key.

In some implementations, the computer-implemented method includes, prior to broadcasting the first funding transaction, detecting confirmation of a second deposit transaction on the blockchain network. The second deposit transaction is configured to allow a further digital asset to be unlocked after a defined period of time through generation of a signature which is valid for the third public key and to be unlocked at any time through generation of a signature which is valid for the second public key.

In some implementations, broadcasting to the blockchain network the first funding transaction is performed automatically in response to detecting confirmation of the second deposit transaction.

In some implementations, the first deposit transaction includes metadata specifying an amount of funding to be provided in the first funding transaction and a second funding transaction and wherein the second deposit transaction includes metadata specifying the amount of funding to be provided in the first funding transaction and the second funding transaction.

In some implementations, the computer-implemented method includes, prior to broadcasting the first funding transaction, verifying that the second deposit transaction specifies an expected amount of funding to be provided in the first funding transaction and the second funding transaction.

In some implementations, the second public key is associated with a group of nodes operating under a threshold signature scheme.

In some implementations, the method further includes broadcasting a first encapsulated commitment transaction. The first encapsulated commitment transaction includes a commitment transaction as metadata. The commitment transaction is signed using a first private key corresponding to the first public key. In some implementations, the first encapsulated commitment transaction is broadcast before expiration of the defined period of time.

In some implementations, the computer-implemented method further includes: prior to broadcasting the first encapsulated transaction, detecting confirmation of a second funding transaction on the blockchain network. The second funding transaction encumbers a further digital asset with the first public key, the second public key and the third public key such that the encumbrance of the further digital asset may be removed by: 1) both a signature valid for the first public key and a signature valid for the third public key; or 2) a signature valid for the second public key.

In some implementations, the first encapsulated transaction is for nominal digital assets.

In some implementations, the computer-implemented method further includes detecting confirmation of a second encapsulated commitment transaction broadcast by a node associated with the third public key. The second encapsulated commitment transaction includes a further commitment transaction as metadata. The further commitment transaction is signed using a third private key corresponding to the third public key.

In some implementations, the computer-implemented method further includes broadcasting the further commitment transaction to nodes of the blockchain network.

In some implementations, the computer-implemented method further includes exchanging one or more further commitment transactions directly with a node associated with the third public key.

In accordance with the invention, there may be provided an electronic device. The electronic device includes an interface device, a processor coupled to the interface device and a memory coupled to the processor. The memory has stored thereon computer executable instructions which, when executed, configure the processor to perform a method described herein.

In accordance with the invention, there may be provided a computer readable storage medium. The computer readable storage medium includes computer-executable instructions which, when executed, configure a processor to perform a method described herein.

BRIEF DESCRIPTION OF THE DRAWINGS

These and other aspects of the present invention will be apparent from and elucidated with reference to, the embodiment described herein. An embodiment of the present invention will now be described, by way of example only, and with reference to the accompany drawings, in which.

DETAILED DESCRIPTION

Blockchain Network

Figure 1:
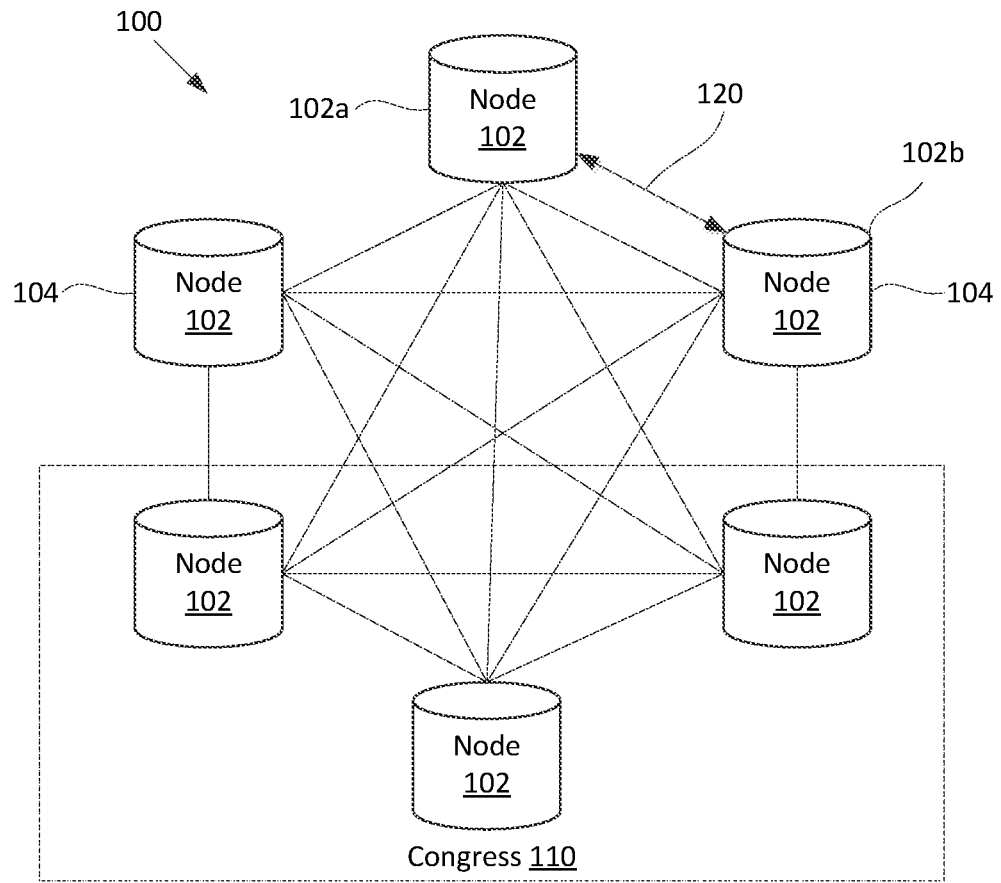
FIG. 1 illustrates a block diagram of an example blockchain network.

Reference will first be made to FIG. 1 which illustrates, in block diagram form, an example blockchain network 100 associated with a blockchain. The blockchain network may be a public blockchain network, which is a peer-to-peer open membership network which may be joined by anyone, without invitation or without consent from other members. Distributed electronic devices running an instance of the blockchain protocol under which the blockchain network 100 operates may participate in the blockchain network 100. Such distributed electronic devices may be referred to as nodes 102. The blockchain protocol may be a Bitcoin protocol, for example.

The electronic devices that run the blockchain protocol and that form the nodes 102 of the blockchain network 100 may be of various types including, for example, computers such as desktop computers, laptop computers, tablet computers, servers, mobile devices such as smartphones, wearable computers such as smart watches or other electronic devices.

Nodes 102 of the blockchain network 100 are coupled to one another using suitable communication technologies which may include wired and wireless communication technologies. Such communication adheres to the protocol associated with the blockchain network. For example, where the blockchain is a bitcoin blockchain, the bitcoin protocol may be used.

Nodes 102 maintain a global ledger of all transactions on the blockchain. Thus, the global ledger is a distributed ledger. Each node 102 may store a complete copy or a partial copy of the global ledger. In the case of a blockchain secured by proof-of-work, transactions by a node 102 affecting the global ledger are verified by other nodes 102 so that the validity of the global ledger is maintained. When the blockchain is a proof-of-work based blockchain, blocks are also verified by checking the proof-of-work submitted with the block.

At least some of the nodes 102 operate as miners 104 of the blockchain network 100. The blockchain network 100 of FIG. 1 may be a proof-of-work blockchain in which miners 104 perform expensive computations in order to facilitate transactions on the blockchain. For example, the proof-of-work blockchain may require miners to solve a cryptographic problem. In Bitcoin, the miners 104 find a nonce such that a block header hashes, with SHA-256, to a number that is less than a value defined by the current difficulty. The hashing power required for the proof-of-work algorithm means that a transaction is considered practically irreversible after a certain number of blocks have been mined on top of it. A miner 104 who solves the cryptographic problem creates a new block for the blockchain and broadcasts the new block to other nodes 102. The other nodes 102 verify that the miner 104 has, in fact, solved the cryptographic problem and has, therefore, demonstrated sufficient proof-of-work before accepting that the block should be added to the blockchain. The block is added to the blockchain (i.e., to the distributed global ledger) by consensus of the nodes 102.

As an alternative to proof-of-work, the blockchain network 100 may, instead, be a proof-of-stake blockchain network. A proof-of-stake blockchain network provides an alternative mechanism for achieving consensus. In the proof-of-stake blockchain network, the blockchain is secured by proof-of-stake rather than proof-of-work. Under proof-of-stake, the miners deposit a security deposit of digital assets and, the probability of being selected as the node to mine a block is proportional to the quantity of the digital assets provided as a security deposit. Proof-of-stake blockchain systems can be used to avoid the computational expense and energy required to mine on proof-of-work blockchains. Further, proof-of-stake blockchains can allow for higher frequency and more regular block creation than proof-of-work blockchains.

The block created by the miner 104 includes transactions which had been broadcast to the block chain by nodes 102. For example, the block may include transactions from an address associated with one of the nodes 102 to an address associated with another of the nodes 102. In this way, the block serves as a record of a transaction from one address to another. The party which requested that the transaction be included in the block proves that they are authorized to initiate the transfer (e.g., in the case of Bitcoin, to spend the Bitcoin) by signing the request using a private key corresponding to their public key. The transfer may only be added to the block if the request is validly signed.

In the case of Bitcoin, there is a one-to-one correspondence between public keys and addresses. That is, each public key is associated with a single address. Thus, any reference herein to transferring digital assets to or from a public key (e.g., paying into the public key) and transferring digital assets to or from the address associated with that public key refer to a common operation.

Some of the nodes 102 in the blockchain network may not operate as miners and may, instead, participate as validating nodes. Validation of transactions may involve checking signature(s), confirming reference to valid UTXO, etc.

The example of FIG. 1 includes five nodes 102, two of which are participating as miners 104. In practice, the number of nodes 102 or miners 104 may be different. In many blockchain networks, the number of nodes 102 and miners 104 may be much greater than the number illustrated in FIG. 1.

As will be explained below, various nodes 102 may cooperate to form a group which will be referred to herein as a congress 110. In the example illustrated, three nodes 102 are shown as taking part in the congress 110. However, the actual number of congress 110 members may be much larger.

The congress 110 may be an open-membership group which may be joined by any nodes 102 upon submission of sufficient stake to a pool associated with the congress 110. For example, a node may join a congress through transfer of a digital asset, such as digital currency (such as bitcoin), tokens or other stake or value, to an account (e.g., to a group public address or group public key) associated with the congress 110. A node 102 joining a congress may be any node in the blockchain network including both mining and non-mining nodes.

The congress 110 may be used to facilitate setup of an off-blockchain payment channel 120 between nodes. This off-blockchain payment channel may be referred to herein as an off-chain payment channel, an off-chain channel, or a payment channel. The payment channel allows for the exchange of value off of the blockchain. The payment channel allows the current state of the payment channel (i.e., the respective balances of the nodes involved in the payment channel) to be committed to the blockchain at any time. That is, the parties may transfer value in multiple off-blockchain transactions and may, at some point, update the blockchain to reflect the final state of the payment channel.

In the example embodiment, a payment channel 120 is set up between two nodes—a first node 102a and a second node 102b. While FIG. 1 illustrates a single payment channel, in practice numerous payment channels may be set up between nodes. For example, the first node 102a or the second node 102b may be a hub. The hub may connect to other nodes to provide a hub and spoke (HAS) arrangement in which a central hub (such as the first node 102a) establishes payment channels with both a second node 102b and another node (such as a third node, etc.). This HAS arrangement allows any node connected to the hub to transfer value off-chain to any other nodes connected to that hub or to receive value off-chain from any other nodes connected to the hub. For example, the second node 102b may transfer value to or receive value from the third node off-chain.

During setup of a payment channel, the nodes associated with the payment channel 120 (e.g., in the example illustrated, the first node 102a and the second node 102b) each lock digital assets in a special way so as to fund the payment channel. After setup is complete, these digital assets may be allocated using commitment transactions. More particularly, the payment channel allows the nodes associated with the payment channel to exchange commitment transactions. Commitment transactions are transactions that are exchanged by the nodes without (initial) broadcast to the blockchain network. The commitment transactions provide a ledger which defines the allocation of the digital assets associated with the payment channel 120. This allocation may be referred to as the status of a payment channel 120. The commitment transactions may be broadcast at any time by one of the nodes associated with the payment channel. The commitment transactions may generally operate as described by Poon and Dryja in "The Bitcoin Lightning Network: Scalable Off-Chain Instant Payments", Jan. 14, 2016 (hereinafter "the Lightning Network"). However, the payment channel may be set up in a manner that differs from that described in the Lightning Network. More particularly, a group of nodes referred to herein as a congress may be involved in the setup protocol to allow a node that was to be a party to a payment channel to reclaim digital assets if a counter party (i.e., the other node involved in the payment channel) fails to complete payment channel setup. This allows the payment channels to operate without using segregated witness or a similar transaction-malleability fix.

Electronic Device Operating as A Node

Figure 2:
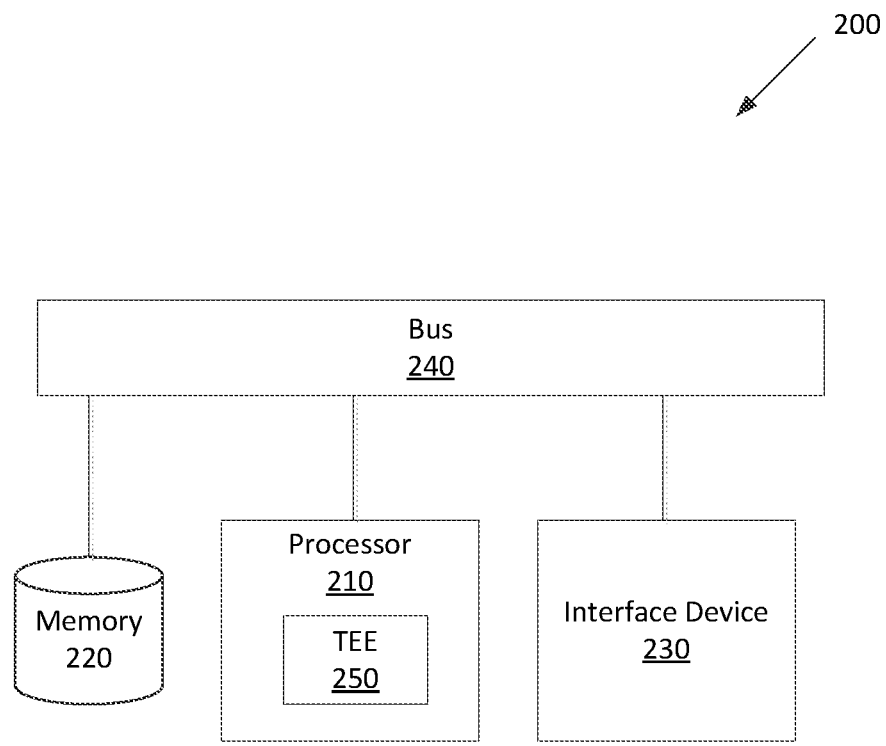
FIG. 2 illustrates a block diagram of an example electronic device which may function as a node in a blockchain network.

FIG. 2 is a block diagram illustrating components of an example electronic device 200 which may serve as a node 102 (FIG. 1) in a peer-to-peer blockchain network 100 (FIG. 1). The example electronic device 200 may also be referred to as a processing device. The electronic device may take various forms including, for example, a desktop computer, laptop computer, tablet computer, server, mobile device such as a smartphone, wearable computer such as a smart watch, or a form of another type.

The electronic device 200 includes a processor 210, a memory 220 and an interface device 230. These components may be coupled directly or indirectly to one another and may communicate with one another. For example, the processor 210, memory 220 and interface device 230 may communicate with each other via a bus 240. The memory 220 stores a computer software program comprising machine-readable instructions and data for performing functions described herein. For example, the memory may include processor-executable instructions which, when executed by the processor 210, cause the electronic device to perform a method described herein. The processor-executable instructions may include instructions which, when executed by the processor 210, cause the electronic device to implement a protocol associated with the blockchain network 100 (FIG. 1). For example, the instructions may include instructions for implementing the Bitcoin protocol.

The memory 220 may store the global ledger of the blockchain network 100 (FIG. 1) or a portion thereof. That is, the memory 220 may store all blocks of the blockchain or a portion of the blocks, such as the most recent blocks, or a portion of the information in some blocks.

While the memory 220 is illustrated with a single block in FIG. 2, in practice the electronic device 200 may include multiple memory components. The memory components may be of various types including, for example, RAM, HDD, SSD, flash drives, etc. Different types of memory may be suited to different purposes. Further, while the memory 220 is illustrated separately from the processor 210, the processor 210 may include embedded memory.

As illustrated in FIG. 2, the processor 210 of some nodes 102 (such as nodes that form the congress 110 and/or nodes that participate in payment channels that provide for a failsafe mode as described herein) may include a secure area such as a Trusted Execution Environment (TEE) 250. The TEE 250 is an isolated execution environment which provides additional security to the electronic device 200 such as isolated execution, integrity of Trusted Applications and asset confidentiality. The TEE 250 provides execution space which guarantees that the computer instructions and data loaded inside the TEE 250 are protected in terms of confidentiality and integrity. The TEE 250 may be used to protect the integrity and confidentiality of important resources, such as keys. The TEE 250 is implemented, at least in part, at a hardware level so that instructions and data executed within the TEE 250 are protected against access and manipulation from the rest of the electronic device 200 and from external parties such as the owner of the electronic device. The data and computations within the TEE 250 are secured from the party operating the node 102 that includes the TEE 250.

The TEE 250 may operate to instantiate an enclave and then add pages of memory one at a time, while cumulatively hashing. A similar operation may also be performed on a remote machine (which may be a developer machine or another machine) so that the remote machine determines and stores the hash that is expected. The contents of an enclave can, therefore, be verified by any remote machine to ensure that the enclave is running an approved algorithm. This verification may be performed by comparing hashes. When an enclave is fully built, it is locked down. It is possible to run the code in the TEE 250 and to send secrets to the code, but the code cannot be changed. A final hash may be signed by an attestation key and may be made available to a data owner to verify it before the data owner sends any secrets to the enclave.

A TEE 250 that is used by a node which acts as a congress member may be used to protect the confidentiality and integrity of a private key share associated with a congress public key used by the congress 110 (FIG. 1). For example, the TEE 250 may be used for the generation and storage of private key shares. The TEE 250 is intended to ensure that no member is able to directly obtain the private key share held within the TEE 250 enclave, or information about other private key shares from inter-member communication or inter-enclave communication. The congresses protocol is also robust against compromise of a threshold of TEEs. Further, the TEE 250 may enable remote attestation which may be used by a node 102 (FIG. 1) to prove to other nodes 102 that a TEE 250 is authentic and is running approved computer executable instructions for a protocol that is implemented by a congress 110 or a payment channel. Remote attestation may be provided by the TEE 250 by running a particular piece of code and sending a hash of the code, internal to the enclave, signed by an internal attestation key for the enclave, which may also be referred to herein as an enclave private key.

The TEE 250 that is provided on a node which acts as a congress member may be used to attest to secure deletion of a private key share when a member of a congress 110 who has previously used the private key share on the electronic device 200 has chosen to leave the congress. The electronic device 200 may provide attestation of deletion to other congress members through a remote attestation protocol provided in the TEE 250. Attestation of deletion may be required before a member is permitted to withdraw their member deposit. That is, return of the deposit may be conditional on attestation to deletion of the private key share held within the member's enclave.

The TEE 250 may be equipped with a secure random number generator, which is internal to an enclave of the TEE 250, which can be used to generate private keys, random challenges, or other random data. The TEE 250 may also be configured to read data from external memory and may be configured to write data to the external memory. Such data may be encrypted with a secret key held only inside the enclave.

The TEE 250 may be implemented using various platforms such as Trusted Platform Module (TPM) or Intel Software Guard Extensions (SGX). SGX, for example, supports remote attestation, which enables an enclave to acquire a signed statement from the processor that is executing a particular enclave with a given has of member known as a quote. A third-party attestation service such as Intel Attestation Service (IAS) may certify that these signed statements originate from authentic CPUs conforming to the SGX specification.

While FIG. 2 illustrates a node (i.e., an electronic device 200) that includes a TEE 250, at least some nodes of the blockchain network 100 may not include TEEs.

The electronic device 200 acts as a node 102 (FIG. 1) in the blockchain network 100 (FIG. 1). Some nodes may join and otherwise take part in a congress 110 (FIG. 1). A congress 110 is formed when a group of digital asset bearers pool digital assets, such as digital currency, tokens or other stake or value supported by the blockchain network 100 (FIG. 1). The congress may, for example, return one or more digital assets to a node that provided such digital assets for the purpose of setting up a payment channel with a counter party if the counter party becomes non-responsive or otherwise fails to operate in accordance with a defined protocol.

Some nodes may take part in the blockchain network as members of the congress or participants in a payment channel. Other nodes may not take part as participants in a payment channel or may not act as congress members. Such nodes may, instead, function as one or more of miners, validators, hubs, or may provide other functions associated with the blockchain network.

Participating in a Payment Channel and Responding to Channel Failure

Figure 3:
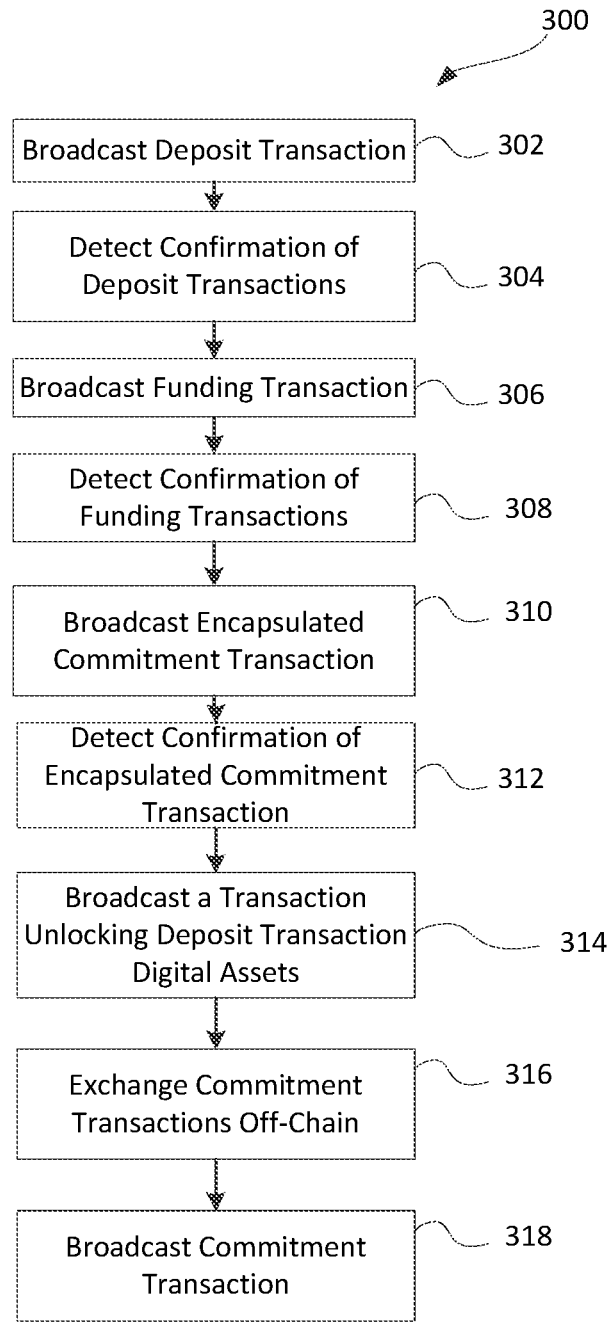
FIG. 3 is a flowchart of an example method of setting up a payment channel.

Referring now to FIG. 3, a method 300 for participating in a payment channel and for responding to channel failure is illustrated. The method 300 may be performed by a node 102 of the blockchain network. Such a node 102 may include computer-executable instructions stored in memory 220 (FIG. 2) which implement the method 300. Such instructions, when executed by a processor 210 (FIG. 2), cause a node 102 (such as an electronic device 200 of the type described with reference to FIG. 2) to perform the method 300. The method 300 may be performed to open a payment channel and may be performed after the node 102 performing the method has agreed with a counter party (i.e., another node that is to be party to the payment channel) on a quantum of digital assets to be used to open the payment channel (i.e., on an amount of "funding" for the payment channel).

At operation 302, the node 102 broadcasts, to nodes of a blockchain network 100, a first deposit transaction. The first deposit transaction is configured to allow a first digital asset to be unlocked after a defined period of time through generation of a signature which is valid for a first public key and to be unlocked at any time through generation of a signature which is valid for a second public key. The first public key is a public key that is associated with the node 102 itself while the second public key is a public key that is associated with a group of nodes operating under a threshold signature scheme. This group of nodes may be referred to as a congress 110. The second public key is, therefore, a public key that is associated with the congress 110. This public key may be referred to as a group public key, a congress public key or a group address.

The first deposit transaction locks the first digital asset to allow the congress (and, more particularly, a number of nodes controlling key shares that are greater than a threshold required under a threshold signature scheme for a congress protocol implemented by nodes of the congress) to assume control of the first digital asset (i.e., to unlock the first digital asset by removing an encumbrance of the digital asset using a signature that is valid for the second public key). Since the first deposit transaction is configured to allow the first digital asset to be unlocked at any time by the congress, a plurality of nodes of the congress that control a sufficient number of key shares for the congress may act to return the first digital asset to the node performing the method 300 if a counter party fails to perform the method 300 of FIG. 3 in order to open the payment channel. Operations for returning the first digital asset that may be performed by the nodes of the congress will be described in greater detail below with reference to FIG. 9.

The first deposit transaction may include metadata specifying an amount of funding that is to be provided by the node performing the method 300 and by a counter party to open the payment channel. That is, the first deposit transaction may include metadata specifying an amount of funding that is to be provided in a first funding transaction and a second funding transaction (these funding transactions will be described in greater detail below with reference to operations 306 and 308). This metadata allows the congress to ensure that both parties to the payment channel have properly funded the payment channel, as will be described below with reference to FIG. 9.

As noted previously, the first deposit transaction also locks the first digital asset with the first public key. The first public key is a public key that is associated with the node performing the method 300 and the first deposit transaction uses the first public key to apply a time-based lock on the first digital asset. The time-based lock allows the digital asset encumbered by the first deposit transaction to be reclaimed by the node by broadcast of a transaction that includes a signature that is valid for the first public key after expiration of a predetermined period of time, t. That is, after the predetermined period of time, t, has elapsed, the first digital asset may be reclaimed by the node performing the method 300 if the node broadcasts a transaction that is signed using a first private key that corresponds to the first public key. The lock that is applied to the first digital asset, however, prevents the node from reclaiming the first digital asset directly before this period of time expires, t. That is, until the period of time, t, expires, the first digital asset can only be unlocked (i.e., spent) by the congress (and, more particularly, by a number of nodes of the congress controlling a sufficient number of key shares to allow them to cooperatively generate a valid signature on behalf of the congress). However, if the congress does not spend the first digital asset in this time, the node performing the method 300 may spend the first digital asset.

The counter party for the payment channel (i.e., another node that is to be party to the payment channel being opened) also broadcasts a deposit transaction, which may be referred to as a second deposit transaction. The labels "first" and "second" as used herein are simply used to differentiate between different items and are not used to indicate order. That is, the first deposit transaction which is broadcast by the node performing the method may be broadcast and/or added to the blockchain before or after the second deposit transaction which is broadcast by the counter party.

The second deposit transaction includes metadata specifying the amount of funding to be provided by the parties to open the payment channel (i.e., in the first funding transaction and the second funding transaction, described below). The statements of the agreed funding (i.e., the funding specified in both the first deposit transaction and the second deposit transaction) should be for the same amount. If the statements of the agreed funding do not correspond to one another, both nodes associated with the payment channel might wait until the period of time, t, expires and reclaim the digital asset associated with their respective deposit transaction.

At operation 304, the node 102 detects confirmation of the first deposit transaction and a second deposit transaction on the blockchain network. The second deposit transaction, which is broadcast by the counter party of the payment channel, is configured to allow a further digital asset to be unlocked after a defined period of time through generation of a signature which is valid for a third public key and to be unlocked at any time through generation of a signature which is valid for the second public key. The third public key is a public key associated with the counter party.

At operation 304, the node 102 may also verify that the second deposit transaction specifies an expected amount of funding to be provided in the first funding transaction and the second funding transaction. For example, the node 102 may verify that the first deposit transaction and the second deposit transaction indicate a common level of funding for the payment channel.

Notably, if the second deposit transaction was not broadcast by the counter party and not detected at operation 304, the node 102 performing the method could wait until the predetermined time, t, has expired and could then reclaim the first digital asset. That is, if the counter party fails to provide a deposit, after expiration of the defined period of time, t, associated with the lock placed on the first digital asset in the first deposit transaction, the node 102 performing the method 300 may broadcast a transaction unlocking the first digital asset (i.e., the digital asset deposited in the first deposit transaction) with a signature which is valid for the first public key. That is, a transaction may be broadcast which includes an unlocking script that includes a signature generated using a first private key corresponding to the first public key. If desired, the transaction may spend the first digital asset by transferring the first digital asset back to an address associated with the node 102 (e.g., by placing a new encumbrance on the digital asset which only requires a signature valid for the first public key associated with the node 102 performing the method 300).

After detecting confirmation of the deposit transactions on the blockchain, the node 102 broadcasts, to the blockchain network, a first funding transaction. The first funding transaction is configured to encumber a second digital asset with the first public key (i.e., the public key associated with the node performing the method 300), the second public key (i.e., the public key associated with the congress) and the third public key (i.e., the public key associated with the counter party) such that the encumbrance of the second digital asset may be removed by: 1) both a signature valid for the first public key and a signature valid for the third public key; or 2) a signature valid for the second public key.

Thus, the first funding transaction is set up so that the two parties to the payment channel can mutually remove the encumbrance on digital assets associated with the funding transaction, or a congress, acting alone, can remove the encumbrance. That is, the funding transaction is set up so that the encumbrance can be removed in one of two ways. If the parties to the payment channel wish to cooperate, the encumbrance could be removed if they both use their respective private key (i.e., the private keys associated with the first public key and the third public key) to generate signatures for a transaction that would spend the encumbered digital assets. Under this scenario, their valid signatures, taken together, remove the encumbrance. The second way in which the encumbrance may be removed involves a plurality of members of a congress cooperating to generate a signature on behalf of the congress which is valid according to a threshold signature scheme. The threshold signature scheme will be discussed in greater detail below in the detailed discussion of congresses. Generally, the threshold signature scheme requires cooperation of a number of congress member nodes that control at least a threshold number of key shares. Since a congress is secured by deposit of stake, the member nodes of the congress risk confiscation of such stake if they act contrary to a congress protocol. For example, if a congress member were to contribute a partial signature to a transaction that would effectively steal the digital assets associated with the funding transaction of operation 306, the congress member would risk having their deposit revoked by cooperation of honest congress members controlling at least a threshold of key shares.

The first funding transaction must be provided within a defined period of time, s, following broadcast of the first deposit transaction. This defined period of time is significantly less than the period of time, t, associated with the lock placed on the first digital asset in the first deposit transaction. Consequently, the first funding transaction must be broadcast within both the defined period of time, t, associated with the lock in the deposit transaction and a further defined period of time, s, that is less than the defined period of time, t, used in the first deposit transaction. The nodes of the congress may be configured to ensure that the first funding transaction is broadcast and/or added to the blockchain in a timely manner (i.e., before the defined period of time, s, expires). If the first funding transaction is not provided in a timely manner, the first digital assets that were encumbered in the first deposit transaction may be confiscated by the congress.

The first funding transaction may be broadcast by the node 102 automatically in response to detecting confirmation of the second deposit transaction (at operation 304).

The first funding transaction funds the payment channel using a quantum of digital assets that was defined in metadata of the first deposit transaction and/or the second deposit transaction. That is, the quantum of digital assets required to be included in the first funding transaction is as defined in the deposit transaction(s). If the quantum of digital assets provided in the first funding transaction differs from the amount expected, based on the metadata in the first deposit transaction, then the congress may confiscate the first digital asset that was provided as a deposit in the first deposit transaction.

The counter party is also required to fund the payment channel with a corresponding funding transaction. This funding transaction may be referred to as a second funding transaction and, at operation 308, the node 102 may detect confirmation of the second funding transaction (and the first funding transaction) on the blockchain. That is, the node may confirm that the second funding transaction and the first funding transaction have been added to the blockchain. The second funding transaction encumbers a further digital asset with the first public key, the second public key and the third public key such that the encumbrance of the further digital asset may be removed by: 1) both a signature valid for the first public key and a signature valid for the third public key; or 2) a signature valid for the second public key. The encumbrance added to the digital assets provided in the second funding transaction corresponds to the encumbrance added to the digital assets provided in the first funding transaction.

The node may also confirm (at operation 308) that the quantum of digital assets in the second funding transaction is an expected amount. That is, the node may confirm that the counter party has properly funded the payment channel. For example, the node may confirm that the quantum of digital assets in the second funding transaction corresponds to the quantum specified in the metadata of the deposit transaction(s).

At operation 310, in response to detecting confirmation of the second funding transaction and the first funding transaction, the node 102 may broadcast a first encapsulated commitment transaction. The first encapsulated commitment transaction is a transaction for nominal digital assets (e.g., digital assets only sufficient to cover mining fees to have the transaction added to the blockchain). The purpose of the first encapsulated commitment transaction is not to exchange value (i.e., to transfer digital assets to another party), but rather to act as a public record of a commitment transaction. A commitment transaction is a record of a state of a payment channel and allows a node to close a channel and receive digital assets back if another party were to become uncooperative. More particularly, a commitment transaction records current balances of the parties to a payment channel. The first encapsulated commitment transaction is a transaction which includes a commitment transaction (i.e., an initial commitment transaction) as metadata. Commitment transactions are configured so that the party receiving the commitment transaction may, at any point, sign and broadcast the commitment transaction to the blockchain network to commit the current state of the payment channel to the blockchain. That is, commitment transactions may be continually exchanged by the parties in a payment channel off-chain and, at any point one of those parties may add their signature to the commitment transaction and broadcast it to attempt to commit the current state of the payment channel to the blockchain.

The initial commitment transaction included in the first encapsulated commitment transaction is, therefore, a half signed transaction. It has been signed by the node performing the method 300 (i.e., signed using a first private key corresponding to the first public key) and the counter party can add their signature to the commitment transaction and broadcast it to the blockchain network in an attempt to commit the current state of the payment channel to the blockchain. By providing the initial commitment transaction as metadata to a transaction that is broadcast to the blockchain network, the congress may confirm that initial commitment transactions have been received so that the parties to the payment channel have a means of closing out a payment channel if the counter party becomes uncooperative. That is, after each party has provided the other party an initial commitment transaction, both parties have a means of closing out the channel which does not require cooperation of the other party.

The counter party is also required to provide an encapsulated commitment transaction, which may be referred to as a second encapsulated commitment transaction, to complete setup of the payment channel. Accordingly, at operation 312, the node 102 performing the method detects confirmation of a second encapsulated transaction broadcast by a node associated with the third public key (i.e., by the counter party). The second encapsulated commitment transaction includes a further commitment transaction as metadata. The further commitment transaction is signed using a third private key (i.e., a private key corresponding to the third public key, which is the public key for the counter party). That is, the further commitment transaction is a half-signed transaction. It is signed by the counter party and the node 102 performing the method could add a signature to this commitment transaction that is valid for the first public key. The node 102 could, if desired, sign and broadcast the further commitment transaction to nodes of the blockchain network to commit a payment channel status defined in the further commitment transaction to the blockchain.

The encapsulated commitment transactions must be provided in a timely manner and such timeliness will be evaluated by the congress. Failure to provide a timely encapsulated commitment transaction can result in confiscation of the deposit (i.e., the digital assets provided in a deposit transaction) and/or all or part of the funding provided in a funding transaction. More particularly, the encapsulated commitment transactions must be broadcast and/or confirmed on the blockchain before expiration of a defined period of time, s', following broadcast of the first deposit transaction. This defined period of time, s', may be less than the period of time, t, associated with the lock placed on the first digital asset in the first deposit transaction but may be greater than the period of time, s, allotted for providing the funding transactions. Accordingly, in at least some implementations, the funding transaction must be broadcast within both the defined period of time, t, associated with the lock in the deposit transaction and a further defined period of time, s that is less than the defined period of time, t, used in the first deposit transaction. By requiring the encapsulated commitment transaction to be broadcast before expiration of the period of time, t, associated with the lock placed on the first digital asset in the first deposit transaction, the congress may confiscate all or part of the digital assets encumbered in the deposit transaction if the encapsulated commitment transaction is not received in a timely manner. However, some implementations may not require the encapsulated commitment transaction to be received during this defined period of time, t. Instead, the congress could confiscate digital assets associated with the payment channel (e.g., digital assets provided in the funding transactions) when an encapsulated commitment transaction is not provided in the defined period of time, s'.

After the encapsulated commitment transactions are confirmed on the blockchain, the payment channel may be considered to be open. At operation 314, after expiration of the defined period of time, t, associated with the lock placed on the first digital asset in the first deposit transaction, the node 102 performing the method 300 may broadcast a transaction unlocking the first digital asset (i.e., the digital asset deposited in the first deposit transaction) with a signature which is valid for the first public key. That is, a transaction may be broadcast which includes an unlocking script that includes a signature generated using a first private key corresponding to the first public key. The transaction may spend the first digital asset by transferring the first digital asset back to an address associated with the node 102 (e.g., by placing a new encumbrance on the digital asset which only requires a signature valid for the first public key associated with the node 102 performing the method 300).

After the payment channel is opened, the node 102 performing the method and the counter party may (at operation 316) exchange one or more further commitment transactions. Such commitment transactions are exchanged directly (e.g., the node performing the method 300 may send commitment transactions directly to and receive commitment transactions directly from the counter party). Commitment transactions may generally be exchanged in the manner described in the Lightning Network. Commitment transactions may be exchanged together with a value that effectively invalidates a previous channel state. That is, the value effectively renders older commitment transactions unusable. Any attempt to broadcast an old (i.e., not current) commitment transaction by a dishonest participant may prove unwise since the value that invalidates the previous channel state may be used by an honest participant to penalize the dishonest participant by claiming all funds in the channel using a breach remedy transaction.

The payment channel may be closed at any time by mutual agreement of the parties to the payment channel. Recall that the funding transaction which was used to fund the payment channel was configured such that both parties to the payment channel (e.g., the node performing the method 300 and the hub) can remove the encumbrance on digital assets by cooperating in a multisignature protocol. Thus, these nodes may cooperate to generate respective signatures for a transaction that would close out the payment channel and redistribute the digital assets previously encumbered by the funding transaction. That is, these nodes may simply redistribute the funds in a manner that accounts for the current state of the payment channel without having to necessarily rely on commitment transactions. This matter of closing the channel may be referred to as "soft resolution". The commitment transactions may, however, be useful if the counter party becomes uncooperative, refusing to sign such a closing transaction. For example, if a counter party refuses to sign a transaction that would close the payment channel through soft resolution, the node 102 performing the method 300 may, at operation 318, sign and broadcast a most-recent commitment transaction to the nodes of the blockchain network 100. Doing so has the effect of redistributing the digital assets in the funding transactions in accordance with a current state for the payment channel. The advantage in closing a channel through soft resolution rather than relying on commitment transactions is that the commitment transaction requires a node to wait an extended period of time (e.g., 1000 blocks) to recover digital assets to allow the other node time to broadcast a breach remedy transaction, if need be. In contrast, soft resolution does not require the node to wait this extended period of time.

If both parties to the payment channel operate in accordance with the payment channel protocol, the nodes of the congress may not be required to take any action. However, if one or both of the parties fail to operate according to the payment channel protocol, the congress may assist with the recovery of digital assets so that such digital assets do not become cryptographically stranded. Once both encapsulated commitment transactions are confirmed and observed to be valid, the congress may no longer be needed and the parties can use and close the payment channel without help from the congress.

Congresses and Threshold Signatures

A congress 110 may be a permissioned or non-permissioned group of nodes 102 operating in a blockchain network. That is, the congress 110 may be joined by a node 102 (FIG. 1) in the blockchain network 100 (FIG. 1) (e.g., by any node that monitors and stores at least a portion of the information in the blockchain). To join the congress 110, a node 102 transfers one or more digital assets to a digital asset pool associated with the congress 110 (i.e., to a public group address associated with one or more digital assets which are, in turn, associated with other members of the congress). This digital asset pool may be referred to as a congress pool. For example, a node 102 may join a congress 110 by transferring (i.e., depositing) such digital assets to an address associated with the congress pool (i.e., to a "congress address" which may also be referred to as a public group address). The digital assets are placed under the control of a group threshold signature with a single public key, referred to as a congress public key. Congress members hold distributively-generated private key shares (i.e., private key shares that are generated at the various nodes that hold such private key shares). The number of shares held may be in proportion to the amount deposited in the pool.

The digital assets that are controlled by the congress 110, which include any digital assets transferred to the congress address (i.e., to a congress public key, which is a public key associated with the congress), are placed under the control of a threshold signature scheme. Under the threshold signature scheme, a group of members whose total private key shareholdings exceed a threshold are needed to produce a valid signature which allows the digital assets to be transferred away from control of the congress 110. That is, at least a threshold number of private key shares must be used to generate a valid signature for any outgoing transfer of digital assets controlled by the congress 110.

The congress public key encumbers the digital assets deposited in the congress pool by the members of the congress 110 in return for private key shares, and any digital assets deposited to the address associated with the congress pool (i.e., placed under full, partial or conditional control of the congress) by members or non-members of the congress 110 which have been deposited (i.e., encumbered by the congress public key) for reasons other than obtaining private key shares. Non-members or members may encumber digital assets with the congress public key for various reasons. For example, as noted above with reference to FIG. 3, a funding transaction for a payment channel may encumber digital assets using a congress public key. By encumbering such digital assets (i.e., digital assets used to open a payment channel) with a congress public key, the congress may implement a failsafe mode if a payment channel fails (e.g., if a hub associated with the payment channel becomes non-responsive).

Since the same congress public key may encumber both member deposits (i.e., digital assets provided by congress members in return for private key shares) and digital assets provided by members or non-members for other purposes, at least some deposits to the congress public key may be specially flagged to indicate the type of deposit. For example, a transaction that transfers the digital asset to the congress address may include a flag, identifier or other attribute which indicates the nature of the deposit being made. By way of example, a transaction that transfers the digital asset to the congress address that is not made for the purpose of joining a congress or boosting a stake in congress membership may include a special identifier to indicate that the deposit is being made for another purpose. Such identifiers may be used by nodes 102 associated with the congress 110 when managing private key share generation (which will be discussed in greater detail below). More particularly, nodes 102 which deposit\encumber digital assets for the purpose of joining the group are allocated private key shares for the congress 110 (as a result of making the deposit of digital assets) while other nodes 102 which encumbered digital assets for other purposes (e.g., to open a payment channel) may not hold congress private key shares for the congress (i.e., corresponding to the congress public key).

The congress 110 may act as a self-governing group in which cooperative behaviour is enforced through the threat of confiscation of all or part of the member deposit. Non-cooperative or malicious members may have such digital assets confiscated by participation in a cooperative protocol by a number of honest members. Further, when a congress member wishes to leave the congress 110, they may withdraw their member deposit (i.e., request that the congress 110 transfer the member deposit back to that member's personal address). However, withdrawal of funds is only performed if a number of private key shares exceeding a threshold required to generate a valid digital signature are used by TEEs, associated with members of the group (i.e., the congress), to generate partial signatures to approve the withdrawal.

The threshold signature scheme implemented by the congress 110 may be of various types. The threshold signature scheme allows distribution of signing power between n parties as long as at least a threshold number of private key shares have contributed towards generating a valid signature and any number of key share holders less than this threshold cannot generate any usable information with regard to the signature. Any subset smaller than the threshold cannot generate a valid signature. More particularly, each of the parties controls a share of a private signing key and a threshold number of key shares must be used to generate a valid signature through the combining of partial signatures. Any subset of key shares that is less than the threshold cannot generate a valid signature through the combination of partial signatures.

The threshold signature scheme may be an Elliptic Curve Digital Signature Algorithm (ECDSA) scheme. For example, an ECDSA scheme may be of the type proposed by Ibrahim et al. in "A robust threshold elliptic curve digital signature providing a new verifiable secret sharing scheme", 2003 EIII 46th Midwest Symposium on Circuits and Systems, 1:276-280 (2003). This threshold signature scheme is an extension of a digital signature scheme which is an elliptic curve cryptography based algorithm in which t+1 key shares from a party of n key share holders are required to reconstruct a private key. The scheme may be used to construct a valid signature without having to reconstruct a private key and without any party having to reveal their key share to another party.

Since t+1 key shares are sufficient to reconstruct the secret, the maximum number of permissible adversaries according to this technique is t. An adversary, in the model of Ibrahim et al., is an entity who has corrupted a party holding a secret share and has access to that secret share. Adversaries can be of various types. For example, a Byzantine adversary is an adversary who may pretend to participate in a protocol while they are, in fact, sending incorrect information. The ECDSA scheme proposed by Ibrahim is robust against up to $t<=n/4$ malicious adversaries. This robustness could rise to $t<=n/3$, but at the cost of greater complexity.

The ECDSA scheme of Ibrahim et al. is robust against halting $t<=n/3$ halting adversaries. A halting adversary is able to prevent a corrupted party from participating in a protocol or halt participation part-way through.

This ECDSA scheme includes various mechanisms which could be used by the nodes 102 to identify a malicious or uncooperative party. For example, verifiable secret sharing (VSS) may be used to share a polynomial required for Shamir's Secret Sharing (SSS). SSS is a form of secret sharing in which a secret is divided into parts and provided to each participant in its own unique part. These parts may be used to reconstruct the secret. VSS may be used, by the nodes 102, to identify a malicious node 102 or member if inconsistent shares are provided to different nodes 102 or if a share is secretly sent to a node that is different than the blinded share which is broadcast to all nodes. Inconsistent shares may be identified by any one of the nodes 102. The sharing of the secret may be made verifiable by including auxiliary information which allows nodes 102 to verify their shares as consistent.

The sending of an incorrect share to an individual node (i.e., a share that is different than the blinded share that is broadcast) can be identified by the intended recipient node of the share. The identification of an incorrect share being secretly sent to a node can be rendered publicly verifiable using techniques of Publicly Verifiable Secret Sharing (PVSS). Such techniques may avoid a possible delay in the identification of a cheating sender which might occur where PVSS is not used and a recipient of an incorrect share is off line or cut off from a substantial fraction of the network when the incorrect share is sent.

Misbehaviour, such as providing inconsistent shares to different nodes, may be addressed by a congress 110 to deter malicious behaviour. For example, when a node 102 (FIG. 1) is identified by other nodes 102 as a malicious party, a number of nodes 102 (i.e., nodes associated with congress members) exceeding a threshold (e.g., t+1) may cooperate to penalize the malicious party. For example, the nodes 102 may take action involving a digital asset (such as digital currency, tokens or other stake or value) deposited to the congress by the malicious party. For example, the congress may burn the digital currency, tokens, stake or value by transferring them to an unspendable address or the congress may confiscate such digital assets by reaching consensus on a decision not to authorize their return to the malicious party. The nodes 102 that are not a misbehaving node may also deter misbehaviour by cooperating to exclude a misbehaving node (e.g., by effectively invalidating key shares; for example, by excluding a node from participating in the congress protocol, or by re-sharing the private key and not allocating the misbehaving node a share).

The ECDSA technique described above may be enhanced through the use of a TEE. For example, the threshold ECDSA signature technique based on Ibrahim et al. contemplates a strong form of adversary, referred to here as a Byzantine adversary. This type of adversary may behave arbitrarily, for example, they not only refuse to participate in the signing process or halt party way through, but may also pretend to honestly participate and send incorrect information. However, by using TEEs, and producing the data used for signing within an enclave of a TEE where a secret private key share is stored, additional security may be provided since it is highly unlikely that enclaves could be compromised in significant numbers. If each TEE is allocated no more than one key share, for example, the number of possible compromised TEEs could reasonably be expected to not approach the threshold for robustness against Byzantine adversaries, assuming n to be sufficiently large. This allows the protocol to be secure if it is tolerant to a small number of malicious adversaries relative to the total number of key shares.

For example, if all nodes of a congress have TEEs, acquisition of a secret stored within an enclave could only be achieved with physical access to a node and only at great effort and expense, provided the manufacturer of the TEE is not corrupted. Such manufacturer-level corruption is expected to be manageable. For example, if a manufacturer were to falsely claim that a number of public keys correspond to genuine TEEs, they could gain direct access to private key shares and potentially launch an attack. However, such an attack would require a sufficient number of key shares to allow the manufacturer to produce a valid signature without assistance from other nodes. This would mean accumulating a large portion of the total stake, can be assumed to be prohibitively expensive. Moreover, by carrying out the attack, a significant percentage of the value of the necessarily vast stake holding would be destroyed.

When TEEs are used, it is useful to contemplate the robustness of the protocol to "corrupted nodes". A corrupted node is a node such that the hardware external to the TEE is corrupted, but the integrity of the TEE is not compromised. A corrupted node may have control over what information the enclave receives and does not receive. In particular, a corrupted node may halt i.e., refrain from participation in the protocol. If information provided to the protocol is required to be signed by a private key held secretly in the enclave (where the corresponding public key was authenticated during attestation) the private key is as trustworthy as the enclave itself. Hence, a corrupted node cannot send arbitrary (authenticated) information to the protocol, and may only attempt to interfere by halting or attempting to fool the enclave into acting improperly, for example, by providing it with outdated information. It follows that, for corrupted nodes, a successful attack would require gathering of a sufficient number of partial signatures to produce a full signature. With TEEs, the protocol of Ibrahim et al. is robust against 2t corrupted nodes. Because a signature can be produced if $n-2t>=2t+1$, any qualified subset of key shares of size $2t+1<=(n+1)/2$ is sufficient. Accordingly, when TEEs are used, a threshold for the threshold signature scheme may be configured to be a number that is greater than or equal to 50% of the key shares to produce a valid signature in the presence of corrupted nodes.

Other threshold signature schemes may also be used. For example, the threshold signature scheme may be an ECDSA threshold scheme of the type proposed by Goldfeder et al., "Securing Bitcoin Wallets Via a New DSA/ECDSA threshold signature scheme", (2015). This protocol allows t+1 parties to produce a valid signature. Consequently, the number of key shares an adversary has to control to produce a valid signature is equal to the number of key shares an adversary has to possess to reconstruct the private key. This technique can provide an efficient scheme in the case in which unanimity is required to produce a valid signature. In the most general case, this scheme imposes space requirements that scale exponentially with the number of congress members since, for an arbitrary threshold one needs to repeat the whole protocol for any possible subset of t+1 players out of n. Thus, for large values of both n and t, a large number of key shares will need to be stored. To mitigate such storage requirements, standard bitcoin multi-signatures could be combined with threshold signatures. In particular, digital assets could be locked using multi signature so that each private key is divided into shares. This technique would make larger congresses more efficient in terms of space requirements. Scaling properties may also be improved by composing a scheme for a large number of participants out of smaller party sizes, at multiple levels, in an iterative fashion. For example, the threshold signature scheme could be combined with techniques of Cohen et al., *Efficient Multiparty Protocols via Log-Depth Threshold Formulae* (2013), Advances in Cryptology—CRYPTO 2013 pp 185-202.

Other threshold schemes may be used including non-ECDSA signature schemes. For example, a threshold scheme based on a Schnorr scheme may be used by the nodes 102 to implement the congress 110.

Nodes 102 (FIG. 1) in the blockchain network 100 (FIG. 1) may implement a congress protocol based on the selected threshold signature scheme. Such nodes 102 may include computer-executable instructions stored in memory 220 (FIG. 2) which implement the congress protocol. Such instructions, when executed by a processor 210 (FIG. 2), cause a node 102 (such as an electronic device 200 of the type described with reference to FIG. 2) to perform one or more methods of the congress protocol. Such methods may include any one or combination of the methods 400, 500, 600, 700, 800, 900 of FIGS. 4 to 9. Thus, the congress protocol may include one or more of the methods 400, 500, 600, 700, 800, 900 of FIGS. 4 to 9. The methods may be performed by a node cooperatively with other nodes associated with other congress members.

Joining a Congress

Figure 4:
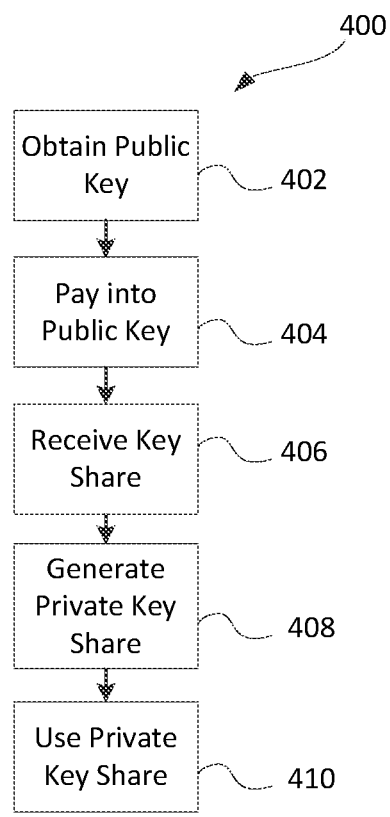
FIG. 4 is a flowchart of an example method of joining a congress.

Reference will now be made to FIG. 4 which illustrates a method 400 of joining a congress. The method may be performed to join a pre-existing congress. That is, the method 400 may be used to join a congress that has been previously initiated.

The method 400 of FIG. 4 includes, at operation 402, obtaining a congress public key. The congress public key may be obtained from a party that is a pre-existing member of the congress or it may be obtained from a third party including, for example, a third party system operating outside of the blockchain network 100 (FIG. 1). For example, the congress public key may be obtained from a public web server accessible over the public Internet. By way of further example, the congress public key may be observed on the blockchain; for example, observed based on metadata included in at least some transactions that transfer digital assets to the congress public key.

The node 102 performing the method 400 pays into the congress public key at operation 404 by broadcasting a transaction of digital assets from a private account associated with the node 102 to a congress address (i.e., an address associated with the congress public key). More particularly, the node 102 broadcasts a transaction to transfer one or more digital assets to a public group address that is associated with the congress public key. The public group address is the address for a congress pool. The congress pool includes other digital assets associated with the other members of a congress. Thus the transaction at operation 404, once added to a block by a miner 104 (FIG. 1) and after the block is confirmed, transfers the digital asset to the congress pool which includes digital assets from other members. The public group address may receive both transfers from parties wishing to join the congress and transfers from parties not wishing to join the congress. The parties who do not wish to join the congress transfer the digital assets to the congress pool so that such digital assets may be placed under total, partial or conditional control by the congress using a threshold signature scheme employed by the congress. For example, as noted above with reference to FIG. 3, the congress public key may encumber digital assets associated with a funding transaction that opens a payment channel.

The transaction at operation 404 may include a flag, identifier or other attribute which indicates that the party transferring the digital asset wishes to join the congress and that the deposit is being made for such purpose.

After depositing the digital assets with the congress pool, the node 102 performing the method 400 receives, at operation 406, a private key share. Then, the node 102 regenerates the private key share at operation 408 by running a single instance of the protocol. The generation of a private key share may be performed within a TEE of the node 102.

At operation 408, the node 102 generates a private key share that is to be used in a threshold signature scheme in which at least a threshold of private key shares must be used to generate a valid signature for a transaction on behalf of the congress. Other holders of private key shares are the other members of the congress who have joined the congress on a permissioned or non-permissioned basis by transfer of respective digital assets to the public group address.

To regenerate the private key shares, at operation 408, the existing congress members may cooperate to update the key shares. For example, a node 102 may generate a random polynomial of order t and with the constant term zero $f_{n+1}^0(x)$. The node 102 may then calculate the point $f_{n+1}^0(n+1)$ and set this as their private key share. The node 102 may then distribute the points on this polynomial $f_{n+1}^0(i)$ to each of the existing congress members, i=1, n. Each existing congress member (i=1, n) then adds the received value to their existing private key share to obtain the new private key share. The node 102 now has a private key share equivalent to all other members and the corresponding public key remains unchanged. As described above, the threshold signature scheme may be of various types including an Elliptic Curve Digital Signature Algorithm or a threshold scheme based on a Schnorr scheme.

The private key share may be generated within a TEE 250 (FIG. 2) and may be securely stored on the node 102. For example, the private key share may be stored in the TEE 250. After the private key shares are generated by respective nodes, funds under control of the previous congress public key (e.g., funds transferred to the public group address that is associated with the original congress public key) may be transferred (through cooperation of a number of group nodes sufficient to generate a valid signature under the threshold signature scheme) to a new congress public key associated with the new private key shares. However, in other embodiments, a node may join a congress in a manner that does not require a new congress public key to be defined. Instead, the same congress public key may be used and TEEs associated with congress nodes may be used to cooperate to allow the node joining the congress to generate a private key share corresponding to the existing congress public key.

After the private key share is generated at operation 408, it may be used at operation 410 of the method 400. The private key share may be used to cooperatively generate a valid signature for a transaction from the public group address which may be broadcast by a member. That is, the private key share may be used in the threshold signature scheme to contribute towards signature generation. Under the threshold signature scheme, a threshold number of private key shares of the congress are required to be used by respective members to produce a valid signature which allows the digital assets to be transferred away from the congress. The node 102 performing the method 500 may retrieve the private key share from storage and use the private key share in order to contribute towards signature generation. If a sufficient number of other congress members also use their respective private key to contribute towards signature generation, the signature is generated and a valid outgoing transaction may be broadcast. When a miner 104 (FIG. 1) of the blockchain network 100 adds the transaction to a mined block which is added to the blockchain by consensus of the nodes 102 in the blockchain network 100 and the block is confirmed, the outgoing transaction is complete. At this point, the digital assets represented in the transaction may no longer be under the control of the congress. That is, such digital assets may no longer be encumbered by the congress public key.

The use of the private key share at operation 408 may be performed within a TEE of the node 102. The TEE protects the private key share such that other parts of the system nor the member themselves cannot access any data stored in an enclave, such as the private key share. Further, the TEE protects the private key in that it cannot retain a copy of the private key if the member wants their deposit back (assuming integrity of the TEE is maintained) and receive their deposit back since it must attest to the deletion of the private key before the member deposit is returned.

The transaction at operation 410 may transfer the digital asset back to the party which originally deposited those digital assets to the congress pool. That is, the transfer may return digital assets to a depositor. The transfer may also transfer the digital asset elsewhere. For example, the digital asset may be transferred to a third party or to an unspendable address. In some cases, one or more digital assets that were encumbered by the congress public key in a funding transaction to open a payment channel may be redistributed by a transaction on the authorization of a congress.

Confiscation of Digital Asset

Figure 5:
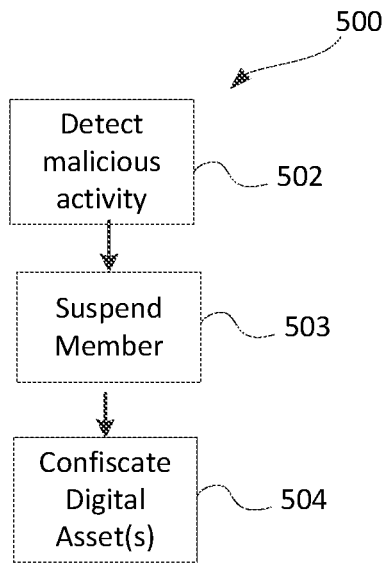
FIG. 5 is a flowchart of an example method of confiscating a digital asset.

Referring now to FIG. 5, an example method 500 of confiscating a digital asset is illustrated.

The method 500 of FIG. 5 may be performed by a node 102 that has previously joined a congress, which may be the same node performing the method 400 of FIG. 4. The method 500 may be performed after operation 408 of the method 400 of FIG. 4 so that the node 102 performing the method 500 already has access to a private key share when the method 500 of FIG. 5 is performed.

At operation 502, the node 102 detects malicious activity by a malicious party. The malicious party may be another member of the congress. Malicious activity is detected when the node 102 determines that a member of the congress is in breach of a pre-defined protocol or criteria. For example, when a node which is a member in the congress reports faulty information (i.e., false, inconsistent or otherwise unacceptable information) to other members of the congress, the member may be deemed to be a malicious member. By way of further example, when a node which is a member of the congress proposes a transaction that would fraudulently transfer away digital assets encumbered by a congress public key (such as digital assets encumbered by a congress public key in a funding transaction to open a payment channel), other honest nodes may act to penalize the member deposit of the fraudster node.

At operation 503, in response to detecting malicious activity, the node 102, in cooperation with other nodes in the congress, may suspend the member that is the malicious party. That is, the congress may exclude the malicious party from further participation in the congress.

To ensure that all nodes 102 operate in conformity with the pre-defined protocol or criteria, member deposits into the congress pool may be subject to confiscation. Confiscation means permanently preventing the return of a member deposit that is deemed confiscated. The digital asset(s) that form the member deposit which are not returned due to the malicious activity may be left in the congress pool but not returned, transferred immediately or in the future to another unspendable address, or otherwise confiscated and the nature of confiscation may depend on whether the congress functions as a bonded validator set for a sidechain. For example, at operation 504, in response to detecting malicious activity by a malicious party, the node 102 performing the method 500 may use the private key share to provide a partial signature on a confiscation transaction. That is, the node cooperates with other nodes of the congress to confiscate at least a portion of the digital assets that were previously transferred to the public group address (i.e., to the congress pool) by the malicious party. That is, in response to observing that the group member is in breach of the pre-defined protocol or criteria, the private key share is utilized to contribute to the authorization of a transaction of one or more digital assets that are associated with that group member and that are held in the congress pool.

Since a threshold signature scheme is used with the congress public key, an individual node acting alone cannot transfer another congress member's deposit of digital assets away from the congress pool (e.g., to an unspendable address). Rather, the digital assets can only be confiscated by transfer when a threshold number of private key shares are used by their respective members to generate a valid signature to transfer the digital asset(s) to another address or when a group of members having at least a threshold number of private key shares reach consensus to suspend a member (at operation 503), which causes any withdrawal request from the suspended member to be automatically ignored. When digital assets are confiscated by transfer, the other address to which the digital asset(s) may be transferred may be associated with an unspendable address. For example, the other address may be an address for which no private key exists so that no party can access the digital assets bound by the public key for the address. When the digital assets are transferred to the unspendable address they may be considered to have been burned, since they are no longer spendable by any members of the congress or indeed by any nodes in the blockchain network 100.

Accordingly, at operation 504, the node may confiscate the digital asset by using the private key share in cooperation with other members of the congress to generate a valid signature for the transaction to the unspendable address.

Further, in some implementations, a congress may serve as a bonded validator set, securing a proof-of-stake sidechain (including a ghostchain, which will be described in greater detail below), and this sidechain may be used as a broadcast channel. For example, a consensus may be reached by the congress members on the sidechain that a member has acted maliciously. This consensus could correspond to confirmation of a sidechain transaction containing incriminating evidence of the malicious activity. When consensus is reached, any request to withdraw a member deposit, made by the malicious member, will be denied and the deposit is considered to be confiscated. All or a portion of the confiscated digital assets may be burnt at some time in the future. That is, at some time later, a threshold of members (not including the malicious member) may collaborate to authorize transfer of the confiscated digital assets to an unspendable address. Some or all of the digital assets may, instead, be sent as a reward to a node who provided evidence of a member's wrongdoing.

Since the congress is an open group which may be joined by any node 102 of the blockchain network 100 through deposit of digital assets, the group membership may periodically change. When such changes occur, the private key share distributions may be updated.

Updating Private Key Share Distributions Using New Public Address

Figure 6:
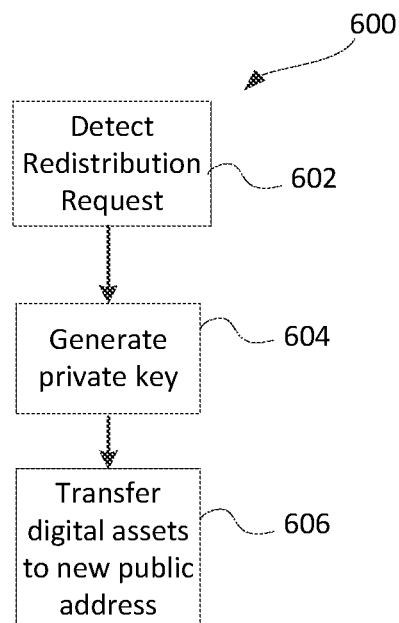
FIG. 6 is a flowchart of an example method of redistributing key shares.

Referring now to FIG. 6, an example method 600 of updating private key share distributions is illustrated. The method 600 may be performed by a node 102 of the blockchain network 100 in cooperation with other nodes of the blockchain network 100.

At operation 602 of the method 600, the node 102 detects a redistribution request, which is a request, the fulfillment of which entails a redistribution of key shares. For example, the node 102 may detect that a prospective new member has transferred digital assets into the public group address or that an existing member has requested withdrawal of a member deposit Digital assets may be transferred to the public group address (i.e., to the congress pool) by nodes requesting to join the congress or increase their participation in the congress and by other nodes who are not requesting to join the congress but are instead transferring the digital assets to the congress for another purpose (such as to transfer the digital assets to a sidechain, as will be described below). At operation 602, the node 102 may identify congress members (i.e., the parties that transferred digital assets to the congress public key to join the congress and not for another purpose) using one or more attributes included in at least some of the transactions of digital assets to the public group address. For example, certain transactions may be flagged as special transactions using an attribute in the transactions. Such attributes (or the presence or absence thereof) may indicate a purpose for which the transfer is made. For example, a flag may be included in a transaction when the transferor is not requesting to join the congress.

In response to detecting the request at operation 602, the fulfillment of which, entails the redistribution of key shares, at operation 604, a new private key share is generated by the node 102 in a manner similar to the manner that the private key share was generated at operation 408 of the method 400 of FIG. 4. Other member nodes of the congress also generate respective private key shares. These private key shares may be used with the threshold signature scheme for the new congress public key. Members who will leave the congress at this point do not generate new private key shares during operation 604 and, since they will not be allocated a private key share for use with the new congress public key, they lose the capacity to take part in the congress and are no longer considered congress members.

Further, in response to detecting a redistribution request (which is a request, the fulfillment of which, entails the redistribution of key shares), at operation 606, the node 102 collaborates with other congress members to transfer all digital assets in the public group address to a new public address associated with a new public key (which will then become the new congress public key).

Thus, according to the method 600 of FIG. 6, when the distribution of deposits changes or when a request is received from a member to withdraw a deposit, private key shares may be regenerated and all of the digital assets under control of the congress may be moved to a new public key. The frequency with which memberships of a congress can be updated is limited by the block time of the blockchain network 100. Many applications may only require rebalancing at low frequencies. (i.e., frequencies that are low compared to the frequency at which blocks are mined on the proof-of-work mainchain).

Figure 7:
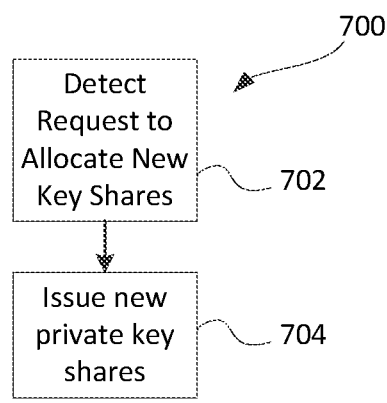
FIG. 7 is a flowchart of a further example method of redistributing key shares.

Updating Private Key Share Distributions while Retaining Existing Public Group Address Referring now to FIG. 7, a further example method 700 of updating private key share distributions is illustrated. The method 700 may be performed by a node 102 of the blockchain network 100 in cooperation with other nodes of the blockchain network 100.

In the method 700 of FIG. 7, the congress public key does not change each time the distribution of member deposits changes. When a request to allocate a new key share is detected (at operation 702, which may occur through deposit of digital assets to the public group address), the node 102 collaborates with other members of the congress to issue (at operation 704) new private key shares for the same public key to the new members of the group. The number of nodes that collaborate is at least the threshold number of nodes required to generate a digital signature under the threshold signature scheme. At operation 704, an additional key share may be allocated while other key shares remain the same. This may entail a change in threshold (of the threshold signature scheme), although the change may in practice be small. Alternatively, at operation 804, an additional key share may be allocated while other key shares are renewed. Such renewal is required to be accompanied by the attestation to deletion of any key shares of the previous generation. In this case, new shares may be allocated while maintaining the same threshold (in the context of SSS, this involves sharing on a new polynomial, of increased order).

At operation 702, the node 102 may identify congress members (i.e., the parties that transferred digital assets to the congress public key to join the congress and not for another purpose) using one or more attributes included in at least some of the transactions of digital assets to the public group address. For example, certain transactions may be flagged as special transactions using an attribute in the transactions. Such attributes (or the presence or absence thereof) may indicate a purpose for which the transfer is made. For example, a flag may be included in a transaction when the transferor is not requesting to join the congress.

When members leave a congress which uses the method 700, they may securely delete their private key share. In order to ensure that private key shares of old members are unusable, the members of the congress may be required to use nodes 102 having a special TEE. The TEE is an architecture implemented at the hardware level which guarantees that instructions and data executed within them are protected against access and manipulation from the rest of the system. The TEE may employ hardware mechanisms to respond to remote attestation challenges which can be used to validate the system's integrity to an external party, such as the other nodes in the congress.

Each member node may use a certified TEE configured to generate one or more random secret values which remains inaccessible to the host system without compromising the hardware at the integrated circuit level. Secret values generated in this way would be used in distributed generation of private key shares (e.g., at operation 410 of the method 400 of FIG. 4). This secret value could also be used to establish the shared public key in the set up phase of the congress. Computations associated with the set up protocol are performed within the TEE enclaves so that no member or former member can derive any information about their own or others private key shares from inter-member communication or any other method. The enclaves within the TEEs enable a remote attestation protocol to be performed which may be used to prove to other nodes that the TEE enclave is authentic and that it is running approved computer-readable instructions.

Computations associated with group changes are performed within the TEE enclave. For example, the generation of a new secure random secret that may be used in calculating a new polynomial for the purposes of SSS is performed in the TEE enclave.

The TEE enclave also aims to ensure that previous key shares and previous secrets that are no longer to be used are securely deleted before a member deposit can be returned. More particularly, in order to have a member deposit returned, an attestation protocol may require that the TEE enclave publicly attests to the deletion of a key share. Each node 102 may interpret such an attestation as a confirmation that the required deletion has occurred on other nodes through the remote attestation protocol. Thus, the method 800 may also include confirming that a private key share previously held within the TEE of a member who has left the congress has been deleted from a node associated with that member. This confirmation may be performed by receiving attestation of deletion of the private key share. Accordingly, the remote attestation protocol may be used to obtain attestation to the deletion of the private key share previously held in the TEE of a member who has left the congress.

The method 600 of FIG. 6 and the method 700 of FIG. 7 each offer various benefits. For example, the method 600 of FIG. 6 does not rely on secure deletion and does not need to rely on trusted hardware. However, the method 600 of FIG. 6 could benefit from such hardware since, in some circumstances, such hardware may make the malicious pooling of key shares more unlikely.

Figure 8:
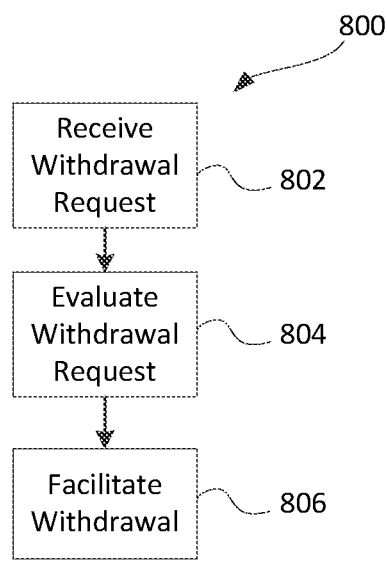
FIG. 8 is a flowchart of an example method of returning a deposit.

The method 700 of FIG. 7 avoids having to relock digital assets under a new congress public key each time the membership changes. Further, in some circumstances the method 700 may update membership faster than the method 600 of FIG. 6 since, under the method 700 of FIG. 7 a transaction does not need to be added to the blockchain to move all digital assets to a new public key because digital assets are not moved to a new public key. That is, the membership may be updated using the method 700 of FIG. 7 without having to wait for several blocks to be generated to confirm transfer of the digital assets to the new public key since the public key does not change Disenrollment from Congress As noted above, group members may occasionally request to leave the congress and, when a group member disenrolls from a congress, the digital assets that they deposited to the congress pool may be returned to them. Referring now to FIG. 8, an example method 800 of returning a deposit is illustrated in flowchart form. The method may be performed by a node 102 in cooperation with other nodes 102 of the congress.

At operation 802 of the method 800, the node 102 receives a withdrawal request from a requestor who is a congress member. The withdrawal request may also be referred to as a disenrollment request. The withdrawal request is a request to withdraw digital assets previously deposited by the requestor and currently controlled by the congress. The request may have been broadcast, by the requestor to all congress members.

In response to receiving the withdraw request, the node 102, at operation 804, evaluates the withdraw request against determined criteria. Such criteria may be predetermined criteria. If the congress operates according to a congress protocol in which the congress public key is not changed each time group membership changes, then at operation 804, the node 102 may confirm that a private key share has been deleted by the requestor. Such confirmation may be obtained using a remote attestation protocol associated with a TEE.

If the congress protocol is one in which the congress public key is changed when membership changes, the node 102 may not confirm deletion of the private key share since the private key share is no longer effective. Instead, a new congress public key may be used and other digital assets under congress control may be transferred to the new congress public key.

If the node 102 approves the withdrawal request based on the evaluation, at operation 806 the node facilitates withdrawal of the digital assets. That is, the node 102 uses its private key share to cooperatively generate a digital signature and uses the digital signature to transfer the digital assets previously deposited by the requestor back to the requestor. For example, the digital assets may be sent back to the address from which they were previously received. Operation 806 is performed in accordance with the threshold signature scheme so that the withdrawal is only effected if at least the threshold number of congress members authorize the withdrawal. Operation 806 is performed after the member who desires to disenroll is suspended from activity for a period of time. This waiting period prevents the member from engaging in misbehaviour while the protocol for return of their member deposit is being performed.

The congress protocol may be used for a number of different purposes. The congress provides a secure mechanism for performing various functions. The congress may operate trustlessly and provides control of ownership over a digital asset.

The congress protocol may, for example, be used to facilitate setup of a payment channel and, more particularly, to prevent digital assets from becoming cryptographically stranded during setup of a payment channel.

Congress for Payment Channel Setup

Figure 9:
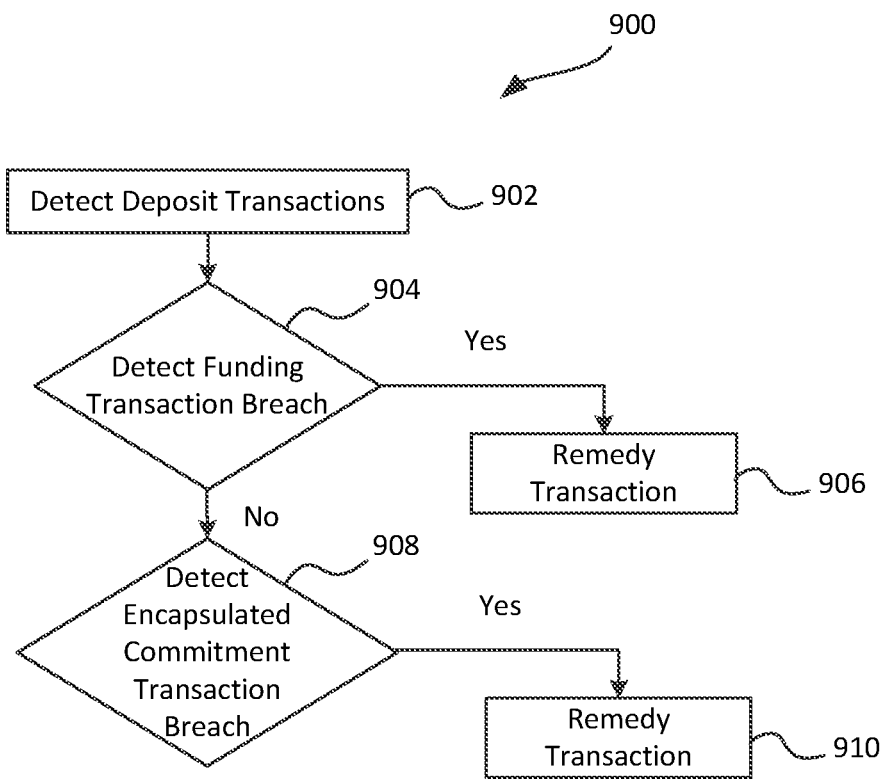
FIG. 9 is a flowchart of an example method of assisting in the setup of a payment channel.

Referring now to FIG. 9, an example method 900 of facilitating setup of a payment channel is illustrated in flowchart form. The method 900 may be performed by a node 102 that is a member of a congress 110 in cooperation with other nodes 102 that are members of the congress 110. That is, the method 900 is performed by a node 102 that has already joined the congress 110 through deposit of a member deposit into a congress pool, as described above. The node 102 performing the method 900 has, therefore, obtained a private key share, as described above prior to performance of the method 900 of FIG. 9.

At operation 902, a node 102 detects a deposit transaction 902. For example, the node may detect that the first deposit transaction of operation 302 of the method 300 of FIG. 3 has been confirmed on the blockchain. The first deposit transaction includes metadata specifying an amount of funding that is to be provided in funding transactions to open a payment channel between parties. That is, the first deposit transaction may include metadata specifying an amount of funding that is to be provided in a first funding transaction and a second funding transaction (these funding transactions are described in greater detail above with reference to operations 306 and 308 of the method 300 of FIG. 3).

The deposit transactions lock associated digital asset to allow the congress (and, more particularly, a number of nodes controlling key shares that are greater than a threshold required under a threshold signature scheme) to assume control of such digital assets (i.e., to unlock such digital assets by removing an encumbrance of the digital assets using a signature that is valid for a congress public key).

At operation 904, the node 102 may determine whether a funding transaction breach has occurred. That is, the node 102 may determine whether one or more parties associated with the payment channel that is to be opened have breached a predefined requirement related to funding of the payment channel. For example, a funding transaction breach may be determined to have occurred when 1) a funding transaction is not broadcast by one or more of the parties; 2) a funding transaction provides insufficient funding (i.e., the quantum is less than the quantum defined in the metadata of the deposit transaction); or 3) the funding transaction is not confirmed before expiration of defined period of time (which may be a defined period of time, s, following broadcast or confirmation of the first funding transaction).

If a funding transaction breach is detected at operation 902, a remedy transaction may be issued at operation 906 by the node 102 in cooperation with other nodes of the congress. The remedy transaction may, for example, confiscate the digital asset provided as a deposit in a deposit transaction of the party that has caused the funding transaction breach. For example, the deposit of the party that breached the protocol may be confiscated.

The node 102 performing the method 900 cooperates with other nodes of the congress to perform operation 906. More particularly, the node 102 may propose a remedy transaction and add a partial signature to the remedy transaction based on a key share held by that node. Other nodes of the congress may also contribute partial signatures to the transaction. If a sufficient number of key shares are involved in the signing process, a valid signature (i.e., a signature that is valid for the second public key, which is the congress public key) may be generated. The number of key shares that are required to participate is determined based on the threshold signature scheme used by the congress. Notably, not all congress members are required to participate in the signing, provided that the number of nodes that participate hold at least a threshold of key shares. Once a valid signature is generated, the remedy transaction may be broadcast to the blockchain network. The remedy transaction may confiscate digital assets provided as a deposit by the party that is in breach of the protocol. That is, the deposit for the party that did not properly fund the payment channel may be confiscated. This deposit may, for example, be distributed to one or more members of the congress to incentivize participation in the congress. The digital assets provided by the non-breaching party (i.e., the digital assets associated with the deposit transaction and funding transaction) of the non-breaching party may also be returned to the non-breaching party in the remedy transaction.

If there is no breach of the funding transaction requirements, the node 102 may determine whether there is an encapsulated commitment transaction breach at operation 908. That is, the node 102 may determine whether one or more parties associated with the payment channel that is to be opened have breached a predefined requirements related to providing an encapsulated commitment transaction. For example, an encapsulated commitment transaction breach may be determined to have occurred when 1) an encapsulated commitment transaction is not broadcast by one or more of the parties; or 2) the encapsulated commitment transaction is not confirmed before expiration of defined period of time (which may be a defined period of time, s', following broadcast or confirmation of the first funding transaction).

If an encapsulated commitment transaction breach is detected at operation 908, a remedy transaction may be issued at operation 910 by the node 102 in cooperation with other nodes of the congress. The remedy transaction may, for example, confiscate the digital asset provided as a deposit in a deposit transaction of the party that is responsible for the encapsulated commitment transaction breach. For example, the deposit of the party that breached the protocol may be confiscated.

The node 102 performing the method 900 cooperates with other nodes of the congress to perform operation 910. The node 102 may propose a remedy transaction and add a partial signature to the remedy transaction based on a key share held by that node. Other nodes of the congress may also contribute partial signatures to the remedy transaction. If a sufficient number of key shares are involved in the signing process, a valid signature (i.e., a signature that is valid for the second public key) may be generated. Once a valid signature is generated, the remedy transaction may be broadcast to the blockchain network. The remedy transaction may confiscate digital assets provided as a deposit by the party that is in breach of the protocol. That is, the deposit for the party that did not provide an encapsulated commitment transaction may be confiscated. This deposit may, for example, be distributed to one or more members of the congress to incentivize participation in the congress. Any funding provided by a party in a funding transaction may be returned to that party.

While the examples described above have referred to operation codes available in Bitcoin, the methods described herein may also be used with other types of blockchain networks.

Further, any references to defined periods of time as described herein (such as the periods of time, t, s, s', described above) may refer to periods of time that are defined based on traditional measures of time (e.g., seconds, minutes, hours, days, etc.) or non-traditional measures of time, such as blocks. For example, since blocks may be created on some blockchain networks with a reasonably consistent frequency, the number of blocks added to the blockchain since a triggering event may provide a measure of time. Thus, any operations in which a node evaluates whether a defined period of time has expired may involve evaluating the number of blocks that have been added to the blockchain.

The methods described above have been generally described as being performed at a node, but features of the method rely on cooperation with other nodes and could be performed elsewhere.

It should be noted that the above-mentioned embodiments illustrate rather than limit the invention, and that those skilled in the art will be capable of designing many alter-

The invention claimed is:

1. A computer-implemented method for opening an off-chain payment channel comprising:
   broadcasting, to nodes of a blockchain network, a first deposit transaction, the first deposit transaction configured to allow a first digital asset to be unlocked after a first defined period of time through generation of a signature that is valid for a first public key and to be unlocked at any time through generation of a signature that is valid for a second public key;
   before expiration of the first defined period of time, broadcasting to the blockchain network a first funding transaction that encumbers a second digital asset with the first public key, the second public key and a third public key such that the encumbrance of the second digital asset may be removed in either of two ways, wherein the first funding transaction is provided within a second defined period of time which is less than the first defined period of time, and wherein the two ways comprise:
      a first way wherein the encumbrance is removed if both a signature valid for the first public key and a signature valid for the third public key is provided; and
      a second way wherein a signature valid for the second public key is provided, wherein the second public key is associated with a group of nodes operating under a threshold signature scheme, and wherein the group of nodes operate together to remove the encumbrance of the second digital asset by providing a signature valid for the second public key;
   after expiration of the first defined period of time, broadcasting a transaction unlocking the first digital asset with a signature that is valid for the first public key, wherein the nodes of the group of nodes are configured to ensure that the first funding transaction is broadcast and/or added to the blockchain before the second defined period of time expires;
   broadcasting a first encapsulated commitment transaction, the first encapsulated commitment transaction including a commitment transaction as metadata, the commitment transaction being signed using a first private key corresponding to the first public key; and
   detecting confirmation of the first encapsulated commitment transaction and a second encapsulated commitment transaction on the blockchain network, wherein the second encapsulated commitment transaction on the blockchain network is broadcast by a node associated with the third public key, the second encapsulated commitment transaction including a further commitment transaction as metadata, the further commitment transaction being signed using a third private key corresponding to the third public key, and
   wherein the off-chain payment channel is considered open upon detection of the confirmation of the first encapsulated commitment transaction and the second encapsulated commitment transaction on the blockchain.

2. The computer-implemented method of claim 1, further comprising, prior to broadcasting the first funding transaction:
   detecting confirmation of a second deposit transaction on the blockchain network, the second deposit transaction configured to allow a further digital asset to be unlocked after a further defined period of time through generation of a signature that is valid for the third public key and to be unlocked at any time through generation of a signature that is valid for the second public key.

3. The computer-implemented method of claim 2, wherein broadcasting to the blockchain network the first funding transaction is performed automatically in response to detecting confirmation of the second deposit transaction.

4. The computer-implemented method of claim 2, wherein the first deposit transaction includes metadata specifying an amount of funding to be provided in the first funding transaction and a second funding transaction and wherein the second deposit transaction includes metadata specifying the amount of funding to be provided in the first funding transaction and the second funding transaction.

5. The computer-implemented method of claim 4, further comprising, prior to broadcasting the first funding transaction:
   verifying that the second deposit transaction specifies an expected amount of funding to be provided in the first funding transaction and the second funding transaction.

6. The computer-implemented method of claim 1, wherein the first encapsulated commitment transaction is broadcast before expiration of the first defined period of time.

7. The computer-implemented method of claim 1, wherein the first encapsulated commitment transaction is for nominal digital assets.

8. The computer-implemented method of claim 1, further comprising:
   broadcasting the further commitment transaction to one or more nodes of the blockchain network.

9. The computer-implemented method of claim 1, further comprising:
   exchanging one or more additional commitment transactions directly with the node associated with the third public key.

10. A non-transitory computer readable storage medium comprising computer-executable instructions that, when executed, configure a processor to perform a computer-implemented method of claim 1.

11. An electronic device comprising:
   an interface device;
   a processor coupled to the interface device; and
   a memory coupled to the processor, the memory having stored thereon computer executable instructions that, when executed, configure the processor to perform a computer-implemented method of claim 1.

* * * * *